(12) United States Patent
Garvey et al.

(10) Patent No.: US 8,204,697 B2
(45) Date of Patent: Jun. 19, 2012

(54) SYSTEM AND METHOD FOR HEALTH ASSESSMENT OF DOWNHOLE TOOLS

(75) Inventors: Dustin Garvey, Celle (DE); J. Wesley Hines, Lenoir City, TN (US)

(73) Assignees: Baker Hughes Incorporated, Houston, TX (US); University of Tennessee Research Foundation, Knoxville, TN (US)

( * ) Notice: Subject to any disclaimer, the term of this patent is extended or adjusted under 35 U.S.C. 154(b) by 301 days.

(21) Appl. No.: 12/428,654

(22) Filed: Apr. 23, 2009

(65) Prior Publication Data

US 2009/0299654 A1 Dec. 3, 2009

Related U.S. Application Data

(60) Provisional application No. 61/047,519, filed on Apr. 24, 2008.

(51) Int. Cl.
*G06F 19/00* (2011.01)

(52) U.S. Cl. ............. 702/34; 702/2; 702/6; 702/11; 702/14; 702/33; 702/44; 702/182; 702/183; 702/185

(58) Field of Classification Search ............ 702/2, 6, 702/11, 14, 33, 34, 44, 182, 183, 185
See application file for complete search history.

(56) References Cited

U.S. PATENT DOCUMENTS

| | | | |
|---|---|---|---|
| 5,924,499 A | 7/1999 | Birchak et al. | |
| 5,942,689 A | 8/1999 | Bonissone et al. | |
| 6,006,832 A | 12/1999 | Tubel et al. | |
| 6,105,149 A | 8/2000 | Bonissone et al. | |
| 6,257,332 B1 | 7/2001 | Vidrine et al. | |
| 6,405,140 B1 | 6/2002 | Chen et al. | |
| 6,411,908 B1 | 6/2002 | Talbott | |
| 6,442,542 B1 | 8/2002 | Ramani et al. | |
| 6,464,004 B1 | 10/2002 | Crawford et al. | |
| 6,466,877 B1 | 10/2002 | Chen et al. | |
| 6,522,978 B1 | 2/2003 | Chen et al. | |
| 6,542,852 B2 | 4/2003 | Chen et al. | |
| 6,556,939 B1 | 4/2003 | Wegerich | |

(Continued)

FOREIGN PATENT DOCUMENTS

GB 2440631 A 6/2008

OTHER PUBLICATIONS

"An Integrated Fuzzy Inference Based Monitoring, Diagnostic, and Prognostic Syste," Garvey, Dustin, May 2007.*

(Continued)

*Primary Examiner* — Sujoy Kundu
(74) *Attorney, Agent, or Firm* — Cantor Colburn LLP

(57) ABSTRACT

A system for assessing the health of a mechanism includes a processor for receiving observation data from at least one sensor, the processor including: a detector receptive to the observation data and capable of identifying whether the mechanism is operating in a normal or degraded mode; a diagnoser to identify a type of fault from at least one symptom pattern; and a prognoser capable of calculating a remaining useful life (RUL) of the mechanism, wherein the prognoser includes a population prognoser for calculating the RUL based on a duration of use of the mechanism, a cause prognoser for calculating the RUL based on causal data, and an effect prognoser for calculating the RUL based on effect data generated from the fault. A method and computer program product for assessing the health of a downhole tool is also disclosed.

18 Claims, 12 Drawing Sheets

U.S. PATENT DOCUMENTS

| | | |
|---|---|---|
| 6,609,212 B1 | 8/2003 | Smith |
| 6,643,799 B1 | 11/2003 | Bonissone et al. |
| 6,775,641 B2 | 8/2004 | Wegerich et al. |
| 6,859,739 B2 | 2/2005 | Wegerich et al. |
| 6,876,943 B2 | 4/2005 | Wegerich |
| 6,892,163 B1 | 5/2005 | Herzog et al. |
| 6,892,317 B1 | 5/2005 | Sampath et al. |
| 6,898,469 B2 | 5/2005 | Bickford |
| 6,917,839 B2 | 7/2005 | Bickford |
| 6,950,034 B2 | 9/2005 | Pacault et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,076,389 B1 | 7/2006 | Gross et al. |
| 7,082,379 B1 | 7/2006 | Bickford et al. |
| 7,085,681 B1 | 8/2006 | Williams et al. |
| 7,103,509 B2 | 9/2006 | Shah et al. |
| 7,107,154 B2 | 9/2006 | Ward |
| 7,120,830 B2 | 10/2006 | Tonack |
| 7,133,804 B2 | 11/2006 | Tonack et al. |
| 7,149,657 B2 | 12/2006 | Goebel et al. |
| 7,158,917 B1 | 1/2007 | Bickford |
| 7,171,589 B1 | 1/2007 | Urmanov et al. |
| 7,233,886 B2 | 6/2007 | Wegerich et al. |
| 7,243,265 B1 | 7/2007 | Wookey et al. |
| 7,292,659 B1 | 11/2007 | Gross et al. |
| 7,292,962 B1 | 11/2007 | Gross et al. |
| 2005/0049753 A1 | 3/2005 | Garcia-Ortiz |
| 2007/0129901 A1 | 6/2007 | DiFoggio et al. |
| 2008/0036457 A1 | 2/2008 | Thern et al. |
| 2008/0183404 A1* | 7/2008 | Emami et al. ............... 702/34 |
| 2010/0064170 A1* | 3/2010 | Gross et al. ............... 714/14 |

OTHER PUBLICATIONS

Wu et al. ("Optimal Design of Degradation Tests in Presence of Cost Constraints") pp. 109-115. Copyrighted 2002.*

Notification Concerning Transmittal of International Preliminary Report on Patentability and Written Opinon of the Interntional Searching Authority for International Application No. PCT/US2009/041679. Mailed Nov. 4, 2010.

Anderson, N. and R. Wilcoxon (2004), "Framework for Prognostics of Electronic Systems", Proceedings of the International Military Aerospace/Avionics COTS Conference, Seattle, WA: Aug. 3-5, 2004.

Atkeson, Christopher G., Andrew W. Moore, and Stefan Schaal (1997a), "Locally Weighted Learning", Artificial Intelligence Review, vol. 11, pp. 11-73: 1997.

Atkeson, Christopher G., Andrew W. Moore, and Stefan Schaal (1997b), "Locally Weighted Learning for Control", Artificial Intelligence Review, vol. 11, pp. 75-113: 1997.

Bonissone, P. and K. Goebel (2002), "When Will It Break a Hybrid Soft Computing Model to Predict Time-to-Break Margins in Paper Machines", Proceedings of SPIE 47th Annual Metting, International Symposium on Optical Science and Technology, vol. 4785, pp. 53-64: 2002.

Brotherton, Tom, Gary Jahns, Jerry Jacobs, and Dariusz Wroblewski (2000), "Prognosis of Faults in Gas Turbine Engines", Proceedings of the IEEE Aerospace Conference, vol. 6, pp. 163-171: Mar. 18-25, 2000.

Choi, Sukhwan and C. James Li (2006), "Estimation of Gear Tooth Transverse Crack Size from Vibration by Fusing Selected Gear Condition Indices", Measurement Science and Technology, vol. 17, pp. 2395-2400: 2006.

Cleveland, W. S. and C. Loader (1994a), Computational methods for local regression , Technical Report 11, AT&T Bell Laboratories, Statistics Department, Murray Hill, NJ: 1994.

Cleveland, W. S. and C. Loader (1994b), Smoothing by local regression: Principles and methods , Technical Report 95.3, AT&T Bell Laboratories, Statistics Department, Murray Hill, NJ: 1994.

Cover, T. M. and P. E. Hart (1967), "Nearest Neighbor Pattern Classification", IEEE Transactions on Information Theory, vol. 13, No. 1: Jan. 1967.

Cox, D. R. (1972), Regression Models and Life-Tables , Journal of the Royal Statistical Society, Series B (Methodological), vol. 34, No. 2, pp. 187-222: 1972.

Creusere, Charles D. and Gary Hewer (1994), "A Wavelet-Based Method of Nearest Neighbor Pattern Classification Using Scale Sequence Matching", Proceedings of the 28th Asilomar Conference on Signals, Systems, and Computers, vol. 2, pp. 1123-1127, Pacific Grove, CA: Sep. 1-2, 1994.

Dale, C. J. (1985), Application of the Proportional Hazards Model in the Reliability Field , Reliability Engineering, vol. 10, pp. 1-14: 1985.

Diaz, Ignacio (2000), Deteccion E Identification De Fallos En Procesos Industriales Mediante Technicas De Procesamiento Digital De Senal Y Redes Neuronales: Aplicacion Al Mantenimeiento Predictivo De Accionamientos Electricos, Ph.D. Dissertation, Universidad De Oviedo, Departamento de Ingenieria Electrica, Electronica, De Computadores Y Sistemas: Jul. 2000.

Diaz, Ignacio, Alberto B. Diez, and Abel A. Cuadrado Vega (2001), "Complex Process Visualization Through Continuous Feature Maps Using Radial Basis Functions", Proceedings of the International Conference on Artificial Neural Networks, Vienna, Austria: Aug. 21-25, 2001.

Diaz, Ignacio and Jaakko Hollmen (2002), "Residual Generation and Visualization for Understanding Novel Process Conditions", Proceedings of the International Joint Conference on Neural Networks: May 12-17, 2002.

Dong, M., D. K. Xu, M. H. Li, and X. Yan (2004), "Fault Diagnosis Model for Power Transformer Based on Statistical Learning Theory and Dissolved Gas Analysis", Proceedings of the IEEE International Symposium on Electrical Insulation, pp. 85-88, Indianapolis, IN: Sep. 19-22, 2004.

Fritz, Jozsef (1975), "Distribution-Free Exponential Error Bound for Nearest Neighbor Pattern Classification", IEEE Transactions of Information Theory, vol. 21, No. 5: Sep. 1975.

Garvey, Dustin and J. Wesley Hines (2006), "An Adaptive Distance Measure for Use with Nonparametric Models", 5th International Topical Meeting on Nuclear Plant Instrumentation, Control and Human- Machine Interface Technologies, Albuquerque, NM: Nov. 12-14, 2006.

Goebel, Kai and Piero Bonissone (2005), "Prognostic Information Fusion for Constant Load Systems", Proceedings of the 8th International Conference on Information Fusion, vol. 2, pp. 1247-1255: Jul. 25-28, 2005.

Greitzer, Frank L. and Thomas Ferryman (2001), ?Predicting Remaining Life of Mechanical Systems, Proceedings of Intelligent Ship Symposium IV: Apr. 2-3, 2001.

Gross, Kenny C., Keith A. Whisnant, and Aleksey M. Urmanov (2006), "Electronic Prognostics Through Continuous System Telemetry", Proceedings of the 60th Meeting of the MFPT Society, Virginia Beach, VA, pp. 56-62: Apr. 3-6, 2006.

Hines, J. Wesley and Alexander Usynin (2006), ?Empirical Model Optimization for Computer Monitoring and Diagnostics/Prognostics , Final Research Report Prepared for Sun Microsystems, Nuclear Engineering Department, University of Tennessee, Knoxville, TN: Dec. 2006.

Humenik, K E. and K.C. Gross (1990), "Sequential Probability Ratio Tests for Reactor Signal Validation and Sensor Surveillance Applications", Nuclear Science and Engineering, vol. 105, pp. 383-390.

Jagannathan, S. and G. V. S. Raju (2000), ?Remaining Useful Life Prediction of Automotive Engine Oils Using MEMS Technologies , Proceedings of the American Control Conference, vol. 5, pp. 3511-3512: Jun. 28-30, 2000.

Khalak, Asif and Andrew J. Hess (2004), ?Modeling for Failure Prognosis in Coupled Systems , Proceedings of the 58th Meeting of the MFPT Society, Virginia Beach, VA, pp. 449-458: Apr. 25-30, 2004.

Koutroumbas, K. and N. Kalouptsidis (1994), "Nearest Neighbor Pattern Classification Neural Networks", Proceedings of the IEEE World Congress on Computational Intelligence and Neural Networks, vol. 5, pp. 2911-2915, Orlando, FL: Jun. 27-Jul. 2, 1994.

Liao, Haitao, Wenbiao Zhao, and Huairui Guo (2006), ?Predicting Remaining Useful Life of an Individual Unit Using Proportional Hazards Model and Logistic Regression Model , Proceedings of the Reliability and Maintainability Symposium (RAMS), pp. 127-132: Jan. 23-26, 2006.

Loecher, M. and C. Darken (2003), "Concurrent Estimation of Time-to-Failure and Effective Wear", Proceedings of the Maintenance and Reliability Conference (MARCON), Knoxville, TN: May 4-7, 2003.

Lu, C. Joseph and William Q. Meeker (1993), ?Using Degradation Measures to Estimate a Time-to-Failure Distribution , Technometrics, vol. 35, No. 2, pp. 161-174: May 1993.

Lu, Jye-Chyi, Jinho Park, and Qing Yang (1997), ?Statistical Inference of a Time-to-Failure Distribution Derived from Linear Degradation Data , Technometrics, vol. 39, No. 4, pp. 391-400: Nov. 1997.

Meeker, William Q., Luis A. Escobar, and C. Joseph Lu (1998), ?Accelerated Degradation Tests: Modeling and Analysis , Technometics, vol. 40, No. 2, pp. 89-99: May 1998.

Mishra, S., S. Ganesan, M. Pecht and J. Xie (2004), "Life Consumption Monitoring for Electronic Prognostics", Proceedings of the IEEE Aerospace Conference, vol. 5, pp. 3455-3467: Mar. 6-13, 2004.

Murphy, Owen J. (1990), "Nearest Neighbor Pattern Classification Perceptrons", Proceedings of the IEEE, vol. 78, No. 10, pp. 1595-1598: Oct. 1990.

Penha, Rosani M.L. and J. Wesley Hines (2001), ?Using Principal Component Analysis Modeling to Monitor Temperature Sensors in a Nuclear Research Reactor , Proceedings of the 2001 Maintenance and Reliability Conference (MARCON), Knoxville, TN: May 2001.

Pook, Polly K. and Dana H. Ballard (1994), "Deictic Teleassistance", Proceedings of the IEEE/RSJ/GI International Conference on Intelligent Robots and Systems, vol. 1, pp. 245-252, Munich, Germany: Sep. 12-16, 1994.

Ramakrishnan, A. and M. Pecht (2003), A Life Consumption Monitoring Methodology for Electronic Systems , IEEE Transactions on Computer Packaging Technologies, vol. 26, No. 3, pp. 625-634:Sep. 2003.

Spezzaferro, Karen E. (1996), ?Applied Logistic Regression to Maintenance Data to Establish Inspection Intervals , Proceedings of the Annual Reliability and Maintainability Symposium (RAMS), pp. 296-300: 1996.

Suarez, Eva L., Michael J. Duffy, Robert N. Gamache, Robert Morris, and Andrew J. Hess (2004), ?Jet Engine Life Prediction Systems Integrated with Prognsotic Health Management , Proceedings of the IEEE Aerospace Conference, pp. 3596-3602: 2004.

Upadhyaya, Belle R., Masoud Naghedolfeizi, and B. Raychaudhuri (1994), ?Residual Life Estimation of Plant Components , Periodic and Predictive Maintenance Technology, pp. 22-29: Jun. 1994.

Usynin, Alexander, J. Wesley Hines, and Aleksey Urmanov (2006), ?Prognosis of Remaining Useful Life for Complex Engineering Systems , Proceedings of the 5th NPIC&HMIT, Albuquerque, NM: Nov. 12-16, 2006.

Vichar, Nikhil M. (2006), Prognostics and Health Management of Electronics by Utilizing Environmental and Usage Loads, Ph.D. Dissertation, Mechanical Engineering Department, University of Maryland, College Park, MD: 2006.

Vichare, Nikhil M., and Michael G. Pecht (2006), ?Prognostic and Health Management of Electronics , IEEE Transactions on Components and Packaging Technologies, vol. 29, No. 1, pp. 222-229: Mar. 2006.

Wang, P. and G. Vachtsevanos (2001), ?Fault Prognosis Using Dynamic Wavelet Neural Networks , Artificial Intelligence for Engineering Design, Analysis, and Manufacturing, vol. 15, No. 4, pp. 349-365: 2001.

Wilkinson, Chris, Dave Humphrey, Bert Vermeire, and Jim Houston (2004), ?Prognostic and Health Management for Avionics , Proceedings of the IEEE Aerospace Conference, vol. 6, pp. 3654-3662: Mar. 2004.

Wolpert, David H. and William G. Macready (1997), ?No Free Lunch Theorems for Optimization , IEEE Transactions on Evolutionary Computation, vol. 1, No. 1: Apr. 1997.

Wong, K. Daniel (2001), "Geo-Location in Urban Areas Using Signal Strength Repeatability", IEEE Communications Letters, vol. 5, No. 10, pp. 411-413: Oct. 2001.

Xu, Di and Wenbiao Zhao (2005), "Reliability Prediction using Multivariate Degradation Data", Proceedings of the Annual Reliability and Maintainability Symposium, pp. 337-341, Alexandria, VA: Jan. 24-27, 2005.

Yang, Kai and Jianan Xue (1996), ?Continuous State Reliability Analysis , Proceedings of the Annual Reliability and Maintainability Symposium, pp. 251-257: 1996.

Zio, E. and G. E. Apostolakis (1996), ?Two Methods for the Structured Assessment of Model Uncertainty by Experts in Performance Assessments of Radioactive Waste Repositories , Reliability Engineering & System Safety, vol. 54, No. 2-3, pp. 225-241: Nov.-Dec. 1996.

Zuo, Ming J., Renyan Jiang, and Richard C. M. Yam (1999), ?Approaches for Reliability Modeling of Continuous-State Devices , IEEE Transactions on Reliability, vol. 48, No. 1: Mar. 1999.

Cohen, Barbara. "Continuously monitor metal fatigue on rig". Drill Rig technology. www.eandp.info. Jun. 2008 pp. 83.

Luo, Jianhui, Madhavi Namburu, Krishna Pattipati, Liu Qiao, Masayuki Kawamoto, and Shunsuke Chigusa (2003), Model-Based Prognostic Techniques , Proceedings of AUTOTESTCON, pp. 330-340: Sep. 22-25, 2003.

Miner, M. A. (1945), Cumulative Damage in Fatigue , Journal of Applied Mechanics, pp. A-159 to A-164: Sep. 1945.

Mishra, S. and M. Pecht (2002), "In-situ Sensors for Product Reliability Monitoring", Proceedings of the SPIE, vol. 4755, pp. 10-19: 2002.

Mishra, S., M. Pecht, T. Smith, I. McNee, and R. Harris (2002), Remaining Life Prediction of Electronic Products Using Life Consumption Monitoring Approach , Proceedings of the European Microelectonics Packaging Interconnection Symposium, Cracow, Poland, pp. 136-142: Jun. 16-18, 2002.

Ridgetop Semiconductor (2004), Hot Carrier (HC) Prognostic Cell, Ridgetop Semiconductor-Sentinel Silicon Library: Aug. 2004.

Shetty, V., D. Das, M. Pecht, D. Hiemstra, and S. Martin, Remaining life assessment of shuttle remote manipulator system end effector, Proceedings of the 22nd Space Simulation Conference, Ellicott City, MD: Oct. 21-23, 2002.

Wang, Peng and David W. Coit (2007), Reliability and Degradation Modeling with Random or Uncertain Failure Threshold , Proceedings of the Annual Reliability and Maintainability Symposium, Las Vegas, NV: Jan. 28-31, 2007.

Yan, Jihong, Muammer Koc, and Jay Lee (2004), A Prognostic Algorithm for Machine Performance Assessment and Its Applications , Production Planning & Control, vol. 15, No. 8, pp. 796-801: Dec. 2004.

Zacher, Bob, Tate Johnson, Vince Whelan and Vern Fox (2006), Automated Handling Equipment Prognostics Utilizing Damage Accumulation Models , Proceedings of the 60th Meeting of the MFPT Society, Virginia Beach, VA, pp. 47-52: Apr. 3-6, 2006.

Watson, G. S. (1964), "Smooth Regression Analysis" AD467119. National Technical Information Service. pp. 1-16.

Notification Concerning Transmittal of International Preliminary Report on Patentability and Written Opinon of the Interntional Searching Authority for International Application No. PCT/US2009/053859. Mailed Feb. 24, 2011.

* cited by examiner

FIG. 11
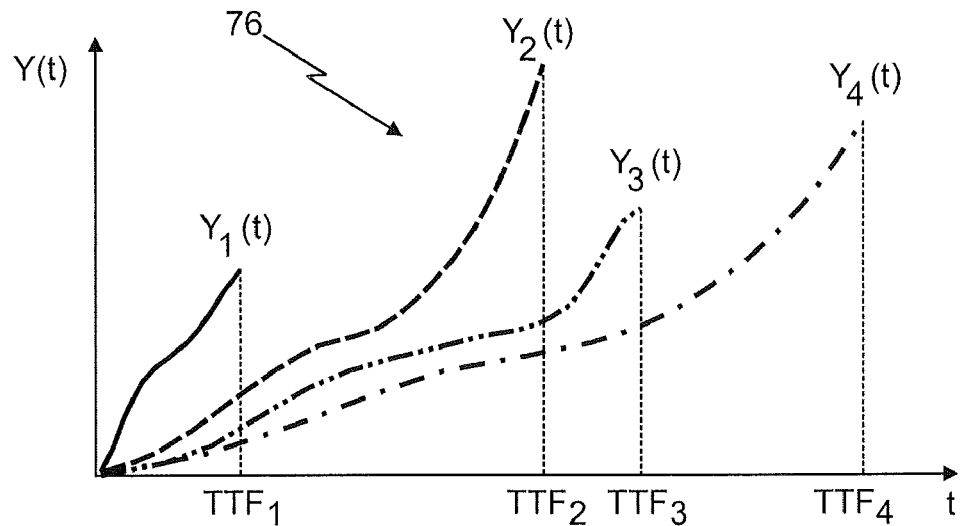
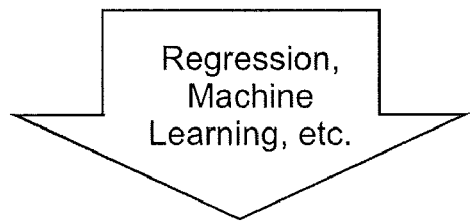
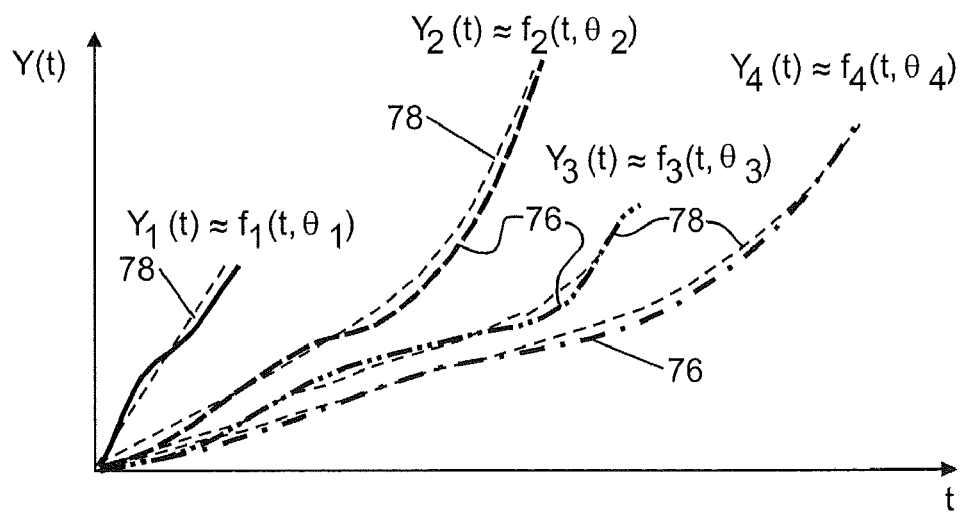

SYSTEM AND METHOD FOR HEALTH ASSESSMENT OF DOWNHOLE TOOLS

CROSS REFERENCE TO RELATED APPLICATION

This application is a non-provisional application of U.S. Ser. No. 61/047,519, filed Apr. 24, 2008, the contents of which are incorporated by reference herein in their entirety.

BACKGROUND OF THE INVENTION

Various tools are used in hydrocarbon exploration and production to measure properties of geologic formations during or shortly after the excavation of a borehole. The properties are measured by formation evaluation (FE) tools and other suitable devices, which are typically integrated into a bottomhole assembly. Sensors are used in the FE tools to monitor various downhole conditions and formation characteristics.

Environments in which FE tools, drilling equipment and other drillstring components operate are very severe, and include conditions such as high down-hole temperatures (e.g., in excess of 200° C.) and high impact vibration events. Furthermore, rig operators are currently using the tools to perform mission profiles that have previously been impossible, thereby increasing the stress on the tools. Simultaneously, customers are demanding high reliability to help them prevent costly down-hole failures.

To date, periodic maintenance has been the most widely spread method by which tool reliability is maintained. As time progresses, there has been a shift toward condition based maintenance, which, as of today, uses design guidelines and rough thresholds for nominal operation to assess individual tool health. Present techniques, however, are inferior in that a large amount of telemetry data collected during operation that has yet to be effectively harnessed.

BRIEF DESCRIPTION OF THE INVENTION

A system for assessing the health of a mechanism includes: at least one sensor associated with the mechanism for generating observation data; a memory in operable communication with the at least one sensor, the memory including a database for storing observation data generated by the sensor; and a processor in operable communication with the memory, for receiving the observation data, the processor including: a detector receptive to the observation data and capable of identifying whether the mechanism is operating in a normal or degraded mode, the degraded mode being indicative of a fault in the mechanism; a diagnoser responsive to the observation data to identify a type of fault from at least one symptom pattern; and a prognoser in operable communication with the at least one sensor, the detector and the diagnoser, the prognoser capable of calculating a remaining useful life (RUL) of the mechanism based on information from at least one of the sensor, the detector and the diagnoser, wherein the prognoser includes a population prognoser for calculating the RUL based on a duration of use of the mechanism, a cause prognoser for calculating the RUL based on causal data, and an effect prognoser for calculating the RUL based on effect data generated from the fault.

A method for assessing the health of a mechanism includes: receiving observation data generated by at least one sensor associated with the mechanism; identifying whether the mechanism is operating in a normal or degraded mode, the degraded mode being indicative of a fault in the mechanism; and responsive to an identification of the degraded mode, identifying a type of fault from at least one symptom pattern, and calculating a remaining useful life (RUL) of the mechanism based on a comparison of the observation data with exemplar degradation data associated with the type of fault, wherein calculating the RUL is based on: a duration of use of the mechanism, causal data, and effect data generated from the fault.

A computer program product is stored on machine readable media for assessing the health of a mechanism by executing machine implemented instructions. The instructions perform: receiving observation data generated by at least one sensor associated with the mechanism; identifying whether the mechanism is operating in a normal or degraded mode, the degraded mode being indicative of a fault in the mechanism; and responsive to an identification of the degraded mode, identifying a type of fault from at least one symptom pattern, and calculating a remaining useful life (RUL) of the mechanism based on a comparison of the observation data with exemplar degradation data associated with the type of fault.

BRIEF DESCRIPTION OF THE DRAWINGS

The following descriptions should not be considered limiting in any way. With reference to the accompanying drawings, like elements are numbered alike:

FIG. 11 illustrates exemplar degradation paths;

DETAILED DESCRIPTION OF THE INVENTION

There is provided a system and method for assessing the health of a downhole tool or other mechanism. The method is a data driven approach for assessing the health of bore hole assembly tools. The method includes analyzing data retrieved from a formation evaluation (FE) tool or other downhole device to determine: 1) whether or not there is a fault in the device, 2) if there is a fault, the type of fault, and 3) a remaining useful life (RUL) of the tool. In one embodiment, the method includes comparing collected telemetry data and associated statistics to data driven models that have been trained to: 1) differentiate between nominal and degraded operation for fault detection, 2) differentiate between a series of possible fault classes for diagnosis, and 3) differentiate between similar and dissimilar degradation paths for prognosis (i.e. the estimation of the remaining useful life).

A detailed description of one or more embodiments of the disclosed system and method are presented herein by way of exemplification and not limitation with reference to the Figures. Additional description of the system and method are provided by the following publications: 1) Dustin R. Garvey and J. Wesley Hines, "Data Based Fault Detection, Diagnosis, and Prognosis of Oil Drill Steering Systems", The University of Tennessee, Knoxville, Department of Nuclear Engineering, and 2) J. Wesley Hines and Dustin R. Garvey, "Monitoring, Diagnostics, and Prognostics for Drilling Operations: Final Report", August 2007, Nuclear Engineering Department, University of Tennessee, both or which are hereby incorporated by reference in their entirety.

Figure 1:
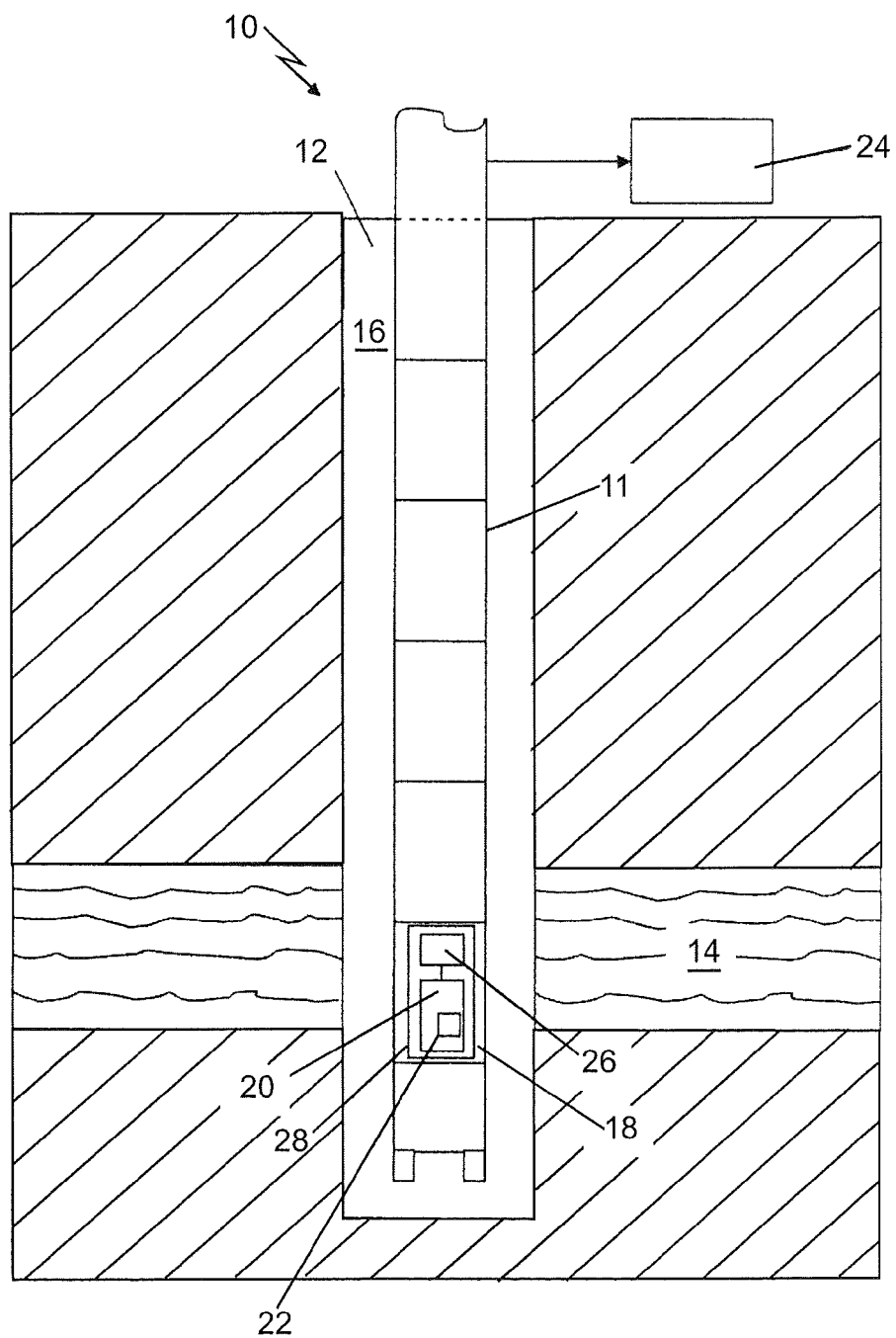
FIG. 1 depicts an embodiment of a well logging system.

Referring to FIG. 1, an exemplary embodiment of a well logging system 10 includes a drillstring 11 that is shown disposed in a borehole 12 that penetrates at least one earth formation 14 for making measurements of properties of the formation 14 and/or the borehole 12 downhole. Drilling fluid, or drilling mud 16 may be pumped through the borehole 12. As described herein, "formations" refer to the various features and materials that may be encountered in a subsurface environment. Accordingly, it should be considered that while the term "formation" generally refers to geologic formations of interest, that the term "formations," as used herein, may, in some instances, include any geologic points or volumes of interest (such as a survey area). In addition, it should be noted that "drillstring" as used herein, refers to any structure suitable for lowering a tool through a borehole or connecting a drill to the surface, and is not limited to the structure and configuration described herein.

In one embodiment, a bore hole assembly (BHA) 18 is disposed in the well logging system 10 at or near the downhole portion of the drillstring 11. The BHA 18 includes any number of downhole formation evaluation (FE) tools 20 for measuring versus depth and/or time one or more physical quantities in or around a borehole. The taking of these measurements is referred to as "logging", and a record of such measurements is referred to as a "log". Many types of measurements are made to obtain information about the geologic formations. Some examples of the measurements include gamma ray logs, nuclear magnetic resonance logs, neutron logs, resistivity logs, and sonic or acoustic logs.

Examples of logging processes that can be performed by the system 10 include measurement-while-drilling (MWD) and logging-while-drilling (LWD) processes, during which measurements of properties of the formations and/or the borehole are taken downhole during or shortly after drilling. The data retrieved during these processes may be transmitted to the surface, and may also be stored with the downhole tool for later retrieval. Other examples include logging measurements after drilling, wireline logging, and drop shot logging.

The downhole tool 20, in one embodiment, includes one or more sensors or receivers 22 to measure various properties of the formation 14 as the tool 20 is lowered down the borehole 12. Such sensors 22 include, for example, nuclear magnetic resonance (NMR) sensors, resistivity sensors, porosity sensors, gamma ray sensors, seismic receivers and others.

Each of the sensors 22 may be a single sensor or multiple sensors located at a single location. In one embodiment, one or more of the sensors includes multiple sensors located proximate to one another and assigned a specific location on the drillstring. Furthermore, in other embodiments, each sensor 22 includes additional components, such as clocks, memory processors, etc.

In one embodiment, the tool 20 is equipped with transmission equipment to communicate ultimately to a surface processing unit 24. Such transmission equipment may take any desired form, and different transmission media and methods may be used. Examples of connections include wired, fiber optic, wireless connections or mud pulse telemetry.

In one embodiment, the surface processing unit 24 and/or the tool 20 include components as necessary to provide for storing and/or processing data collected from the tool 20. Exemplary components include, without limitation, at least one processor, storage, memory, input devices, output devices and the like. The surface processing unit 24 optionally is configured to control the tool 20.

In one embodiment, the tool 20 also includes a downhole clock 26 or other time measurement device for indicating a time at which each measurement was taken by the sensor 20. The sensor 20 and the downhole clock 26 may be included in a common housing 28. With respect to the teachings herein, the housing 28 may represent any structure used to support at least one of the sensor 20, the downhole clock 26, and other components.

Figure 2:
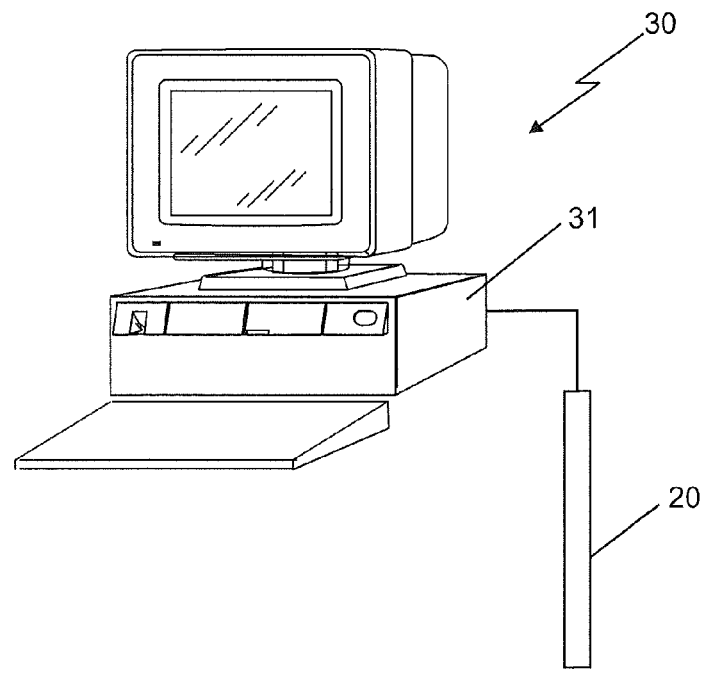
FIG. 2 depicts an embodiment of a system for assessing the health of a downhole tool.

Referring to FIG. 2, there is provided a system 30 for assessing the health of the downhole tool 20, or other device used in conjunction with the BHA 18 and/or the drillstring 11. The system may be incorporated in a computer or other processing unit capable of receiving data from the tool. The processing unit may be included with the tool 20 or included as part of the surface processing unit 24.

In one embodiment, the system 30 includes a computer 31 coupled to the tool 20. Exemplary components include, without limitation, at least one processor, storage, memory, input devices, output devices and the like. As these components are known to those skilled in the art, these are not depicted in any detail herein. The computer 31 may be disposed in at least one of the surface processing unit 24 and the tool 20.

Generally, some of the teachings herein are reduced to an algorithm that is stored on machine-readable media. The algorithm is implemented by the computer 31 and provides operators with desired output.

The tool 20 generates measurement data, which is stored in a memory associated with the tool and/or the surface processing unit. The computer 31 receives data from the tool 20 and/or the surface processing unit for health assessment of the tool 20. Although the computer 31 is described herein as separate from the tool 20 and the surface processing unit 24, the computer 31 may be a component of either the tool 20 or the surface processing unit 24, and accordingly either the tool 20 or the surface processing unit 24 may serve as an apparatus for assessing tool health.

Figure 3:
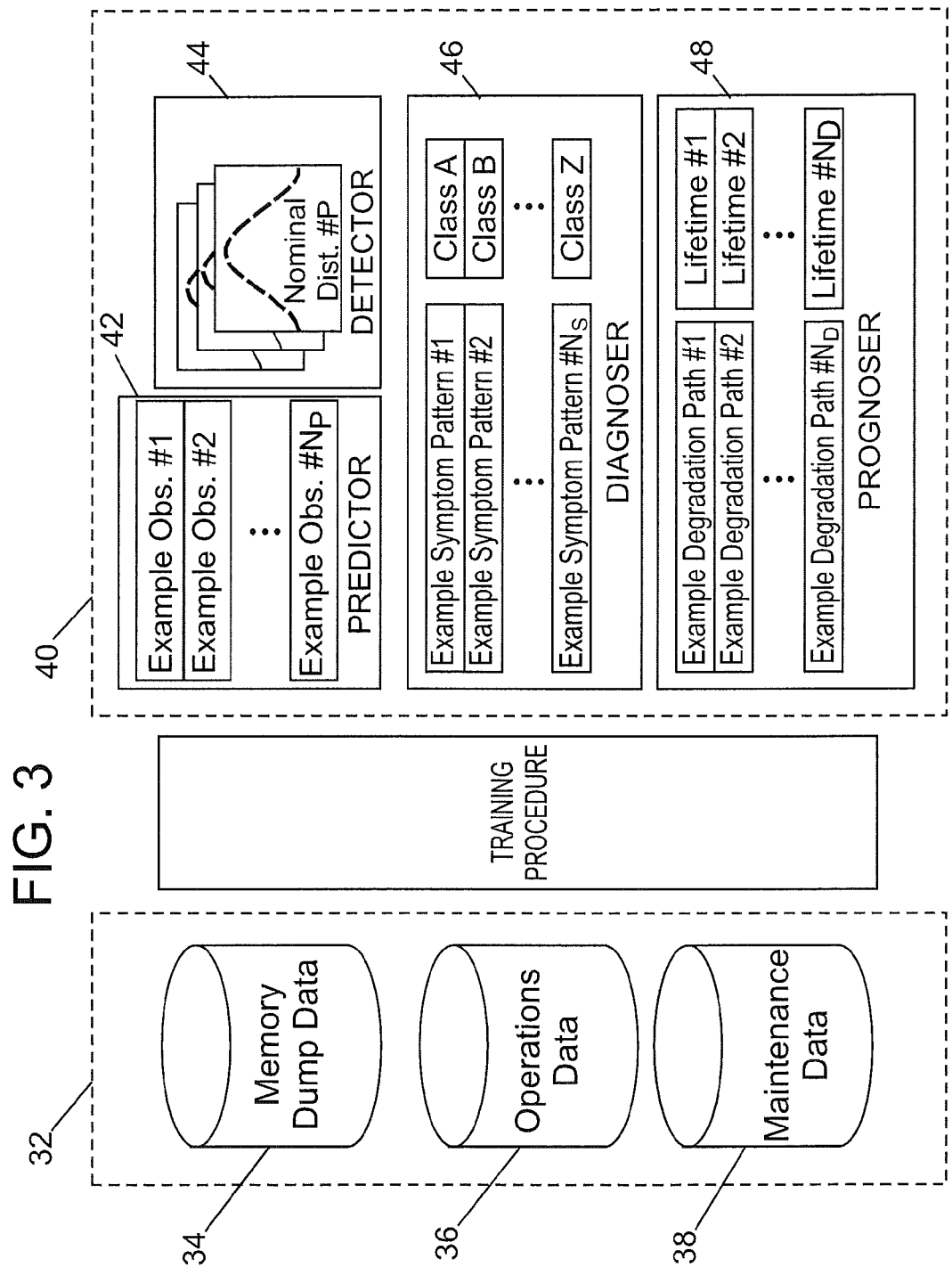
FIG. 3 is a block diagram of another embodiment of the system of FIG. 2.

Referring to FIG. 3, the system 30 includes a memory 32 in which one or more databases 34, 36 and 38 are stored. The system 30 also includes a processor 40, which includes one or more analysis units including empirical models 42, 44, 46 and 48. The models described herein are data driven models, i.e. the data describing input and output characteristics defines the model.

The data used by the system 30 is a plethora of data that describe different aspects of how individual tools within a fleet perform, are used, and in some cases fail. In one embodiment, the data associated with a selected tool 20 is categorized into three main types. The types of data include memory dump data 34, operational data 36, and maintenance data 38.

Memory dump data 34 is a collection and/or display of the contents of a memory associated with the tool 20. Memory dump data 34 includes, for example, sensor readings related to sensed physical quantities in and/or around the borehole, such as temperature, pressure and vibration. Operational data 36 includes measurements relating to the operation of the tool, such as electrical current and motor or drill rotation. Maintenance data 38 includes data retrieved from the tool after a fault is observed.

The predictor 42 and the detector 44 are used to determine whether the tool 20 is operating in either a nominal (i.e., normal) or degraded mode. The predictor 42 produces estimates of measured observations and generates estimate residuals based on comparison with exemplar observations, and the detector 44 evaluates whether the tool is operating in a degraded mode based on the estimate residuals. The diagnoser 46 is used to identify the type or class of any detected faults from symptom patterns generated from the observations. Symptom patterns include, but are not limited to, predictor estimate residuals, alarm patterns, and signals that can be used to quantify environmental or operational stress. The prognoser 48 is used to infer the remaining useful life (RUL) of the tool 20 from observations of its degradation path or history.

In one embodiment, the system is a nonparametric fuzzy inference system (NFIS). The NFIS is a fuzzy inference system (FIS) whose membership function centers and parameters are observations of exemplar inputs and outputs.

In one embodiment, prior to utilizing the system 30 for assessing tool health, the models 42, 44, 46, 48 are trained based on un-faulted data to be able to detect faults, diagnose the faults and determine remaining useful life. This training, in one embodiment, is performed via training procedure 50.

Figure 4:
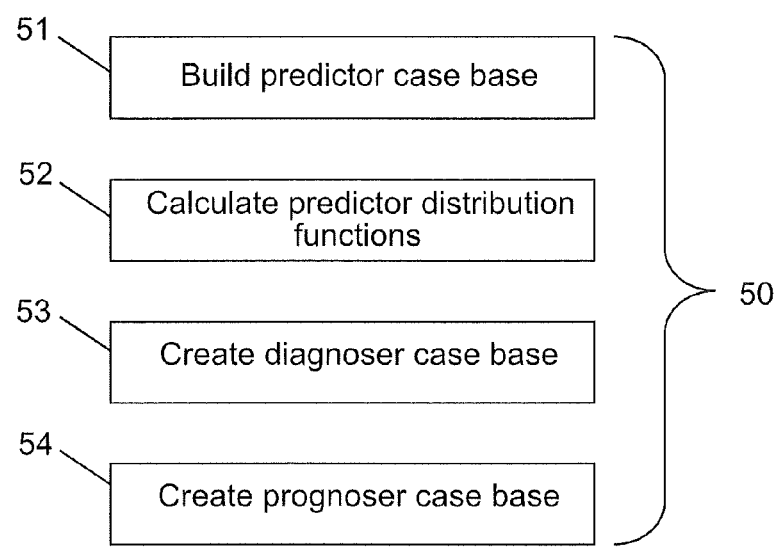
FIG. 4 is a flow chart providing an exemplary method for training models of the system of FIG. 3.

FIG. 4 illustrates a method, i.e., a training procedure 50, for training the models in system 10. The method 50 includes one or more stages 51, 52, 53 and 54. In one embodiment, the method 50 includes the execution of all of stages 51, 52, 53 and 54 in the order described. However, certain stages may be omitted, stages may be added, or the order of the stages changed.

In the first stage 51, the predictor 42 is trained by building a case base in the predictor 42 memory. The predictor's case base is built by selecting a number of exemplar observations, referred to as "Example Obs. #1-#Np" in FIG. 3, from signals collected from un-faulted tool operation. These signals, in one embodiment, are collected from memory dump data 34. As used herein, the term "signal" or "observation" refers to measurement, operations or maintenance data received for the tool 20. Each signal, in one embodiment, consists of one or more data points over a selected time interval.

In one embodiment, each signal may be processed using methods that include statistical analysis, data fitting, and data modeling to produce an observation curve. Examples of statistical analysis include calculation of a summation, an average, a variance, a standard deviation, t-distribution, a confidence interval, and others. Examples of data fitting include various regression methods, such as linear regression, least squares, segmented regression, hierarchal linear modeling, and others.

In the second stage 52, the detector 44 is trained by calculating a residual for each observation by calculating an error between the measured values of the observation and predicted values. Each residual is passed to a statistical routine to construct a number of distribution functions for each residual, such as probability distribution functions (PDFs), that are representative of nominal system operation. These exemplar nominal distribution functions are represented as "Nominal Dist. #P" in FIG. 3, where "P" refers to the number of residual signals.

In the third stage 53, the results of predictor and detector training are combined with selected signal, operations, and maintenance data to create the diagnoser's case base that will be used to map symptom patterns to fault classes.

In this stage, data such as the residuals are extracted from one or more of the databases 32, 34, 36 to create the symptom patterns associated with a known fault type, i.e. fault class. These symptom patterns are then consolidated and included as exemplars in the diagnoser 46. At this point, the diagnoser 46 has effectively learned the relationship between the estimate residuals and known fault classes.

In the fourth stage 54, analysis results from previous stages are combined with additional signal, operations, and maintenance data to create the prognoser's case base that maps degradation paths, such as absorbed vibration, to tool life. Degradation paths utilize data points from the predictor 42, detector 44 and diagnoser 46, such as observation data and alarm data over a time interval including the time that the tool 20 failed. Additional information from the memory dump data 34 may also be combined, such as additional signals or composed signals (ex. running sum above a threshold), to create the degradation paths. Any suitable regression functions or data fitting techniques may be applied to the data retrieved from the tool 20 to generate the degradation path.

FIGS. 5-10 illustrate methods for assessing the health of a downhole tool or other component of a formation evaluation/exploration system, such as a tool used in conjunction with a drillstring to perform a downhole measurement. The methods include various stages described herein. The methods may be performed continuously or intermittently as desired. The methods are described herein in conjunction with the downhole tool 20, although the methods may be performed in conjunction with any number and configuration of sensors and tools, as well as any device for lowering the tool and/or drilling a borehole. The methods may be performed by one or more processors or other devices capable of receiving and processing measurement data, such as the computer 31. In one embodiment, the method includes the execution of all of stages in the order described. However, certain stages may be omitted, stages may be added, or the order of the stages changed.

Figure 5:
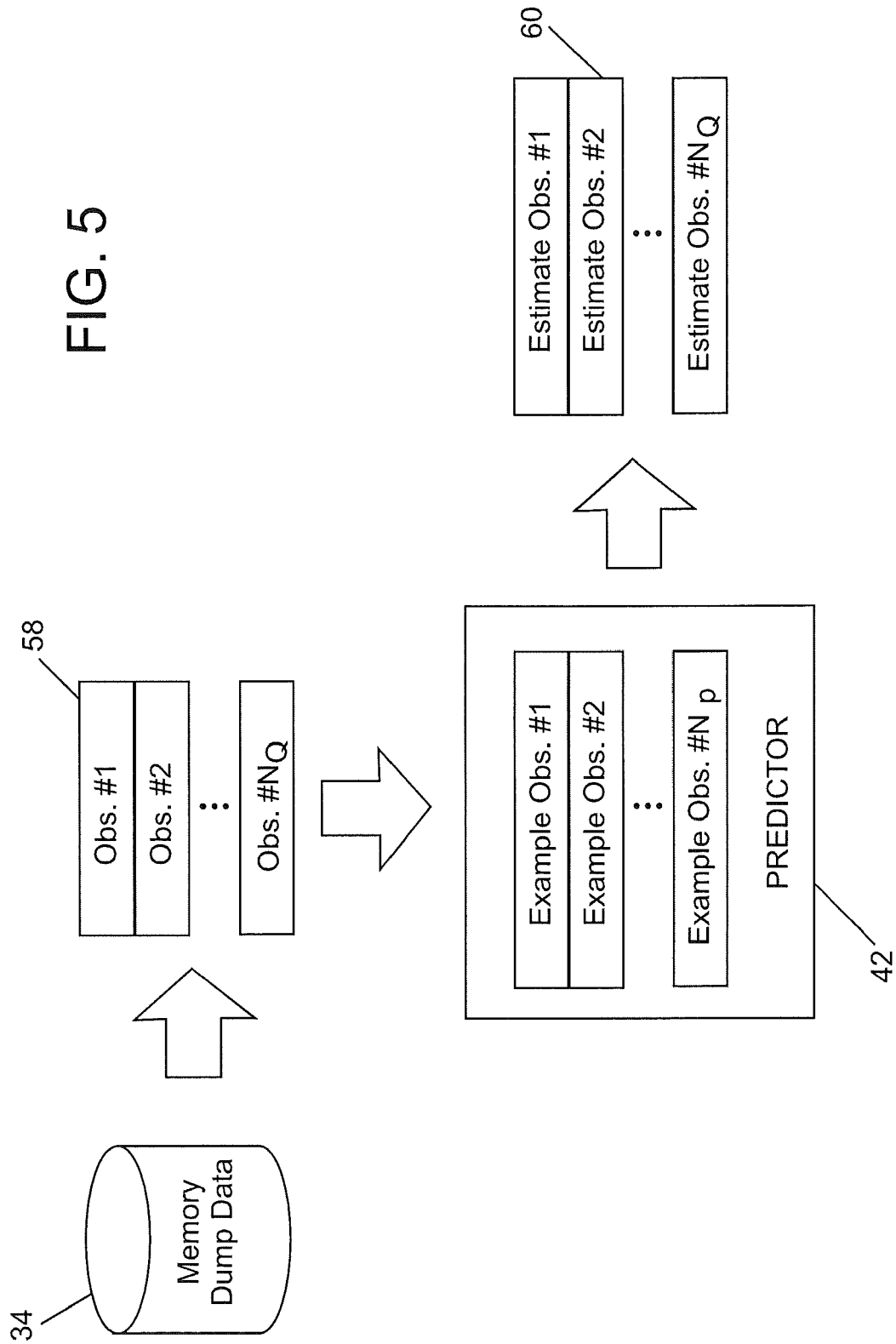
FIG. 5 is a block diagram of a portion of the system of FIG. 2 for generating an estimated observation.

Referring to FIG. 5, in the first stage, tool dump data 34, or other data collected from the tool or other component of the well logging system 10, is collected from the tool's memory to extract useful information. From that data, a number of query observations 58 ("Obs. #1-#NQ), i.e., measured observations, are entered into the predictor 42.

In one embodiment, query observations 58 include any type of data relating to measured characteristics of the formation and/or borehole, as well as data relating to the operation of the tool. In one example, the data includes pressure, electric current, motor RPM, drill rotation rate, vibration and temperature measurements.

The predictor 42 calculates estimated observations 60 ("Estimate Obs. #1-#NQ), by determining which of the predictor's exemplar observations are most similar to each observed query observation 60.

In one embodiment, the predictor 42 is an NFIS predictor. This embodiment of the predictor 42 is a nonparametric, autoassociative model that performs signal correction through correlations inherent in the signals. This embodiment reduces the effects of noise or equipment anomalies and produces signal patterns similar to those from normal operating conditions. In another embodiment, the predictor 42 is an autoassociative kernel regression (AAKR) predictor.

Because the predictor 42 has been previously trained on exclusively "good" data, i.e., data generated during known nominal operation, the predictor 42 effectively learns the correlations present during nominal, un-faulted tool operation. So when these correlations change, which is often the case when a fault is present, the predictor 42 is still able to estimate what the signal values should be, had there not been a change in correlation. Thus, the system 30 provides a dynamic reference point that can be compared to measured observations, in that as soon as there is a change in the signal correlations, there will be a corresponding divergence of the estimates from the observations. Generally, when a fault is present in the well logging system 10, the estimates will generally be far from their observed values for the affected signals.

In one embodiment, the predictor 42 utilizes various regression methods, including nonparametric regression such as kernel regression, to generate an estimate observation 60 that corresponds to a query observation 58. Kernel regression (KR) includes estimating the value by calculating a weighted average of historic, exemplar observations. The methods herein are not limited to any particular statistical analysis, as any methods, such as curve fitting, may be used.

For example, for a number of exemplar observations, KR estimation is performed by calculating a distance "d" of a query observation, i.e., input "x", from each of the exemplar observations "$X_i$", inputting the distances into a kernel function which converts the distances to weights, i.e., similarities, and estimating the output by calculating a weighted average of an output exemplar.

The distance may be calculated via any known technique. One example of a distance is a Euclidean distance, represented by the following equation:

$$d(X_i, x) = X_i - x,$$

where "i" represents a number of inputs. Another example of distance is the adaptive Euclidean distance, in which distance calculation is excluded for those measured observations that lie outside the range of the maximum and minimum input exemplars.

To transform the distance d into a weight or similarity, in one embodiment, a kernel function "$K_h(d)$" is used. An example of such a kernel function is the Gaussian kernel, which is represented by the following equation:

$$K_h(d) = \frac{1}{\sqrt{2\pi h^2}} e^{-d^2/2h^2},$$

where "h" refers to the kernel's bandwidth and is used to control what effective distances are deemed similar. Other exemplary kernel functions include the inverse distance, exponential, absolute exponential, uniform weighting, triangular, biquadratic, and tricube kernels.

In one embodiment, the calculated similarities of the query input x are combined with each of the exemplar values $X_i$ to generate estimates of the output, i.e., estimated observations 60. This is accomplished, in KR for example, by calculating a weighted average of the output exemplars using the similarities of the query observation to the input exemplars as weighting parameters, as shown in the following equation:

$$\hat{y}(x) = \frac{\sum_{i=1}^{n} [K(X_i - x)Y_i]}{\sum_{i=1}^{n} K(X_i - x)},$$

where "n" is the number of exemplar observations in the KR model, "$X_i$" and "$Y_i$" are the input and output for the $i^{th}$ exemplar observation, x is a query input, $K(X_i-x)$ is the kernel function, and $\hat{y}(x)$ is an estimate of y, given x.

In one embodiment, varying numbers and types of inputs and outputs may be analyzed using different KR architectures. The variables and inputs described herein, in one embodiment, are represented by vectors when multiple inputs are used. For example, an inferential KR model uses multiple inputs to infer an output, a heteroassociative KR model uses multiple inputs to predict multiple outputs, and an autoassociative KR (AAKR) model uses inputs to predict the "correct" values for the inputs, where "correct" refers to the relationships and behaviors contained in the exemplar observations.

Figure 6:
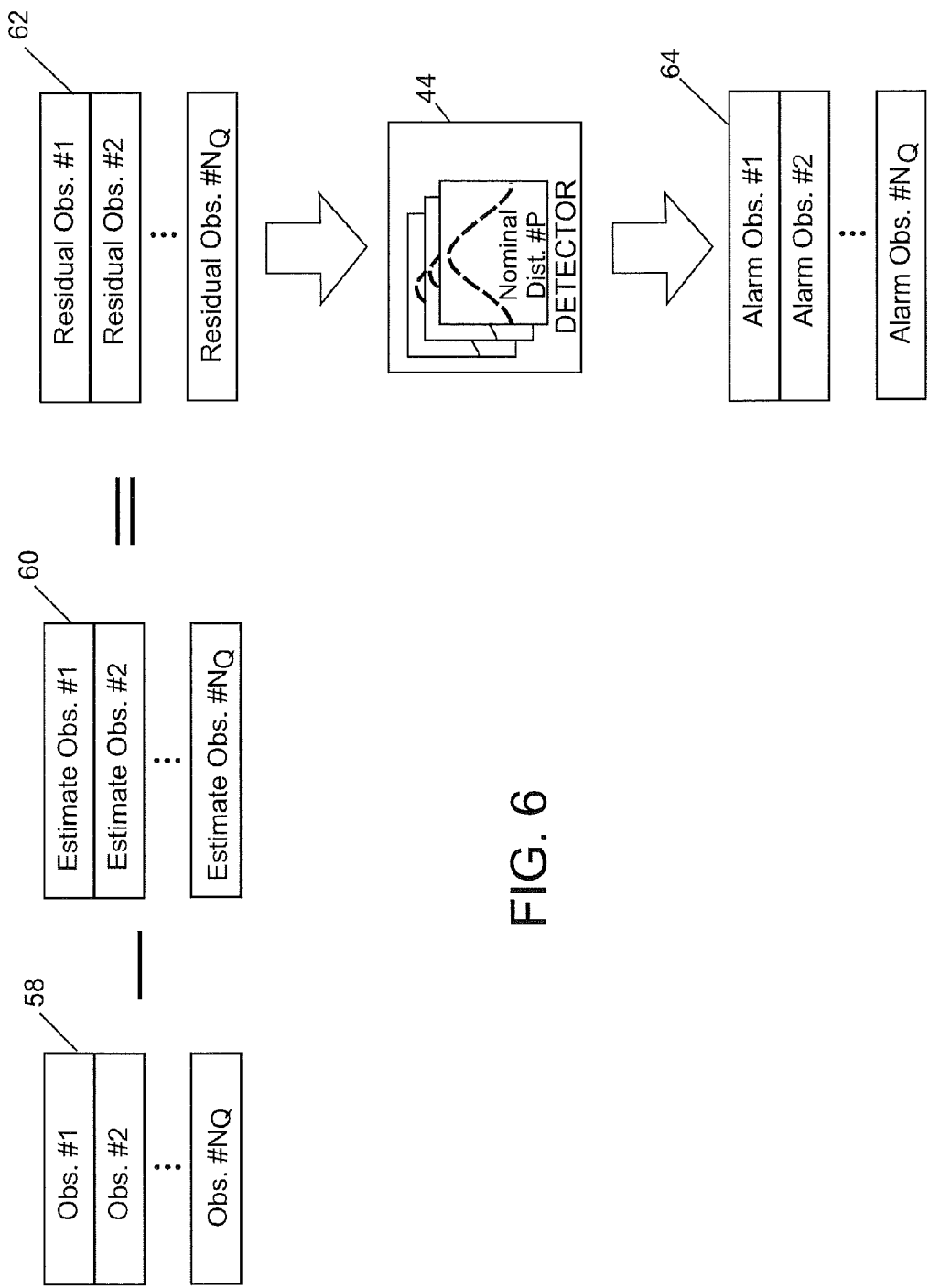
FIG. 6 is a block diagram of a portion of the system of FIG. 2 for generating an alarm indicative of a fault.

Referring to FIG. 6, in the second stage, the estimated observations 60 are used to determine whether a fault has occurred. A number of residuals 62 corresponding to the number "$N_Q$" of observations 58 are calculating by subtracting each estimate observation 60 from a corresponding query observation 58. The resulting residual observations 62 each have a value that represents a change in correlation from the un-faulted observation.

Each residual observation 62 is then passed to the detector 44 which uses a statistical test to determine whether the current sequence of residual observations 62 is more likely to have been generated from a nominal mode (meaning that there is no fault) or a degraded mode (meaning that there is a fault). In one embodiment, the residual observations 62 are evaluated by a cumulative sum (CUSUM) or sequential probability ratio test (SPRT) statistical detector, to determine if the tool is operating in a nominal or degraded mode.

In one embodiment, threshold values for determining whether the tool 20 is operating in a degraded mode are determined. In one example, the nominal mode is defined during training, and a number of degraded modes are enumerated with respect to the nominal mode. Each degraded mode corresponds to a selected threshold. For example, mean upshift and mean downshift degraded modes are defined by offsetting the nominal distribution to a higher and lower mean value, respectively. A series of tests is then performed to indicate which distribution the sequence is most likely to have been generated by.

In one embodiment, a sequential analysis such as a sequential probability ratio test (SPRT) is performed to determine whether the residual observation 62 is resulting from nominal mode operation or degraded mode operation. SPRT is used to determine whether a sensor is more likely in a nominal mode, "$H_0$", or in a degraded mode, "$H_1$". SPRT includes calculating a likelihood ratio, "$L_n$", shown in the following equation:

$$L_n = \frac{\text{probability of observing } \{x_n\} \text{ given } H_1 \text{ is true}}{\text{probability of observing } \{x_n\} \text{ given } H_0 \text{ is true}}$$
$$= \frac{p(\{x_n\}/H_1)}{p(\{x_n\}/H_0)}$$

where $\{x_n\}$ is a sequence of consecutive "n" observations of x. The likelihood ratio is then compared to a lower (A) and upper (B) bound, as those defined by a false alarm probability (α) and a missed alarm probability (β) shown in the following equations:

$$A = \frac{\beta}{1-\alpha}$$
$$B = \frac{1-\beta}{\alpha}$$

If the likelihood ratio is less than A, the residual observation 62 is determined to belong to the system's normal mode $H_0$. If the likelihood ratio is greater than B, the residual observation 62 is determined to belong to the system's degraded mode $H_1$ and a fault is registered.

If any test outcome indicates that the residuals are not likely to have been generated from the nominal mode, the detector 44 generates an alarm 64, which indicates that a fault in the tool 20 has potentially occurred. Such alarms 64 are referred to as "Alarm Obs. #1-#$N_Q$", and may be any number of alarms 64 between zero and NQ.

If the output of the detector 44 indicates that the tool 20 is operating normally (i.e., no fault or anomaly has occurred), then no maintenance or control action is performed and the system 30 examines the next observation. However, if the detector 44 indicates that the tool 20 is operating in a degraded mode, the prediction and detection results are passed to the diagnoser 46, which maps provided symptom patterns 66 (i.e. prediction residuals, signals, alarms, etc.) to known fault conditions to determine the nature of the fault.

Figure 7:
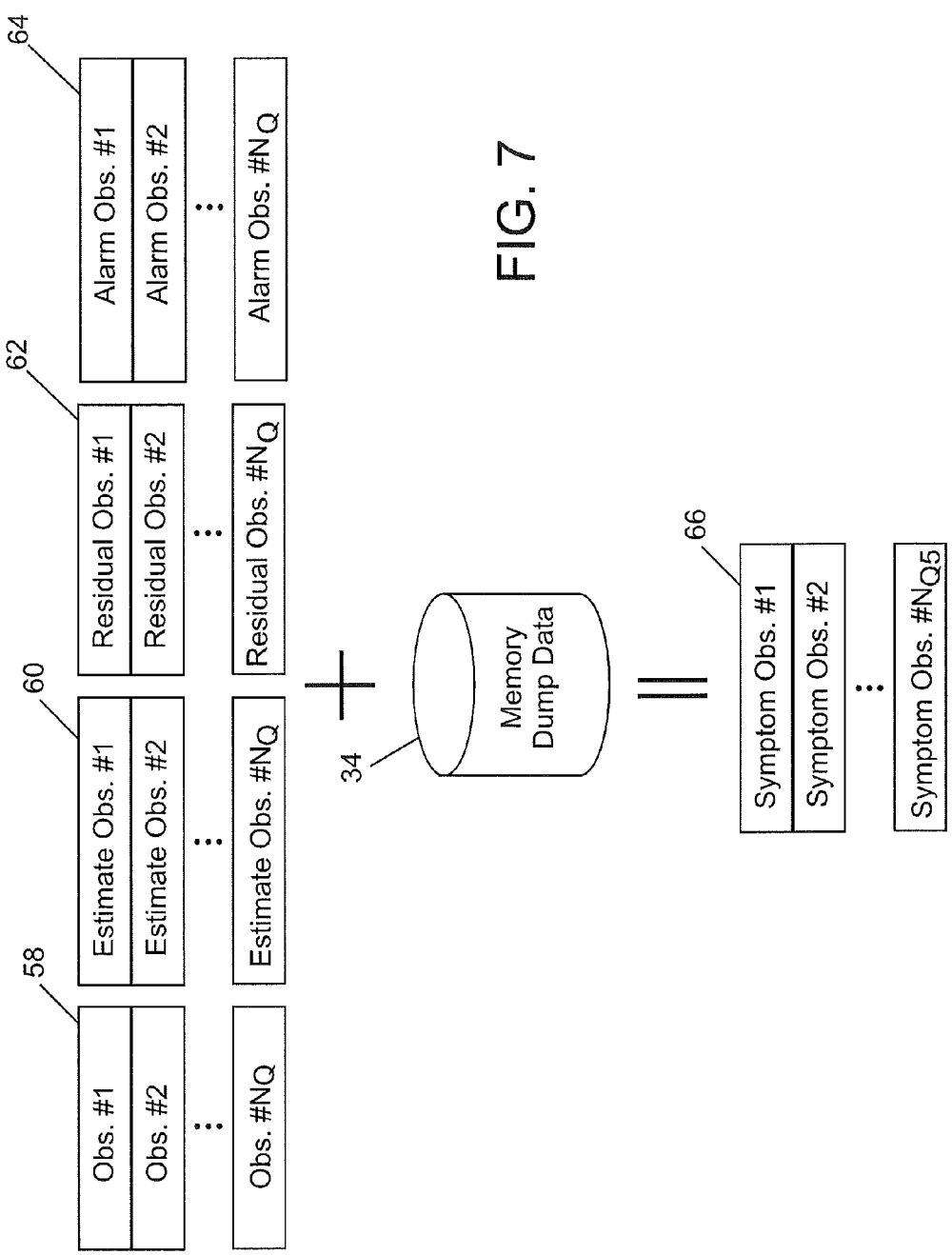
FIG. 7 is a block diagram of a portion of the system of FIG. 2 for generating a symptom observation.

Referring to FIG. 7, in the third stage, symptom patterns 66 are created by the processor 40 that encapsulate a sufficient amount of information to differentiate between the identified faults. The symptom patterns 66 are referred to as "Symptom Obs. #1-$N_{QS}$" in FIG. 7, where "$N_{QS}$" is a number less than or equal to NQ. The symptom patterns 66 are calculated by combining the data from predictor 42 and detector 44, including one or more of the query observations 58, estimate observations 60, residual observations 62 and alarms 64 for each signal. In one embodiment, additional information from the memory dump data 34, such as additional signals or a synthesis of additional signals, and/or signals that can be used to quantify environmental or operational stress, is also combined with the data from the predictor 42 and the detector 44 to create the symptom observations 66.

In one embodiment, the residual observations 62, optionally in combination with the alarms 64, are provided as the symptom patterns 66. Examples of symptom patterns 66 include measured hydraulic unit signal values alone and with associated residuals, stick-slip signals (i.e., a rate by which a drill rotates in its shaft) with associated estimate residuals, and vibration signals with associated estimate residuals.

Figure 8:
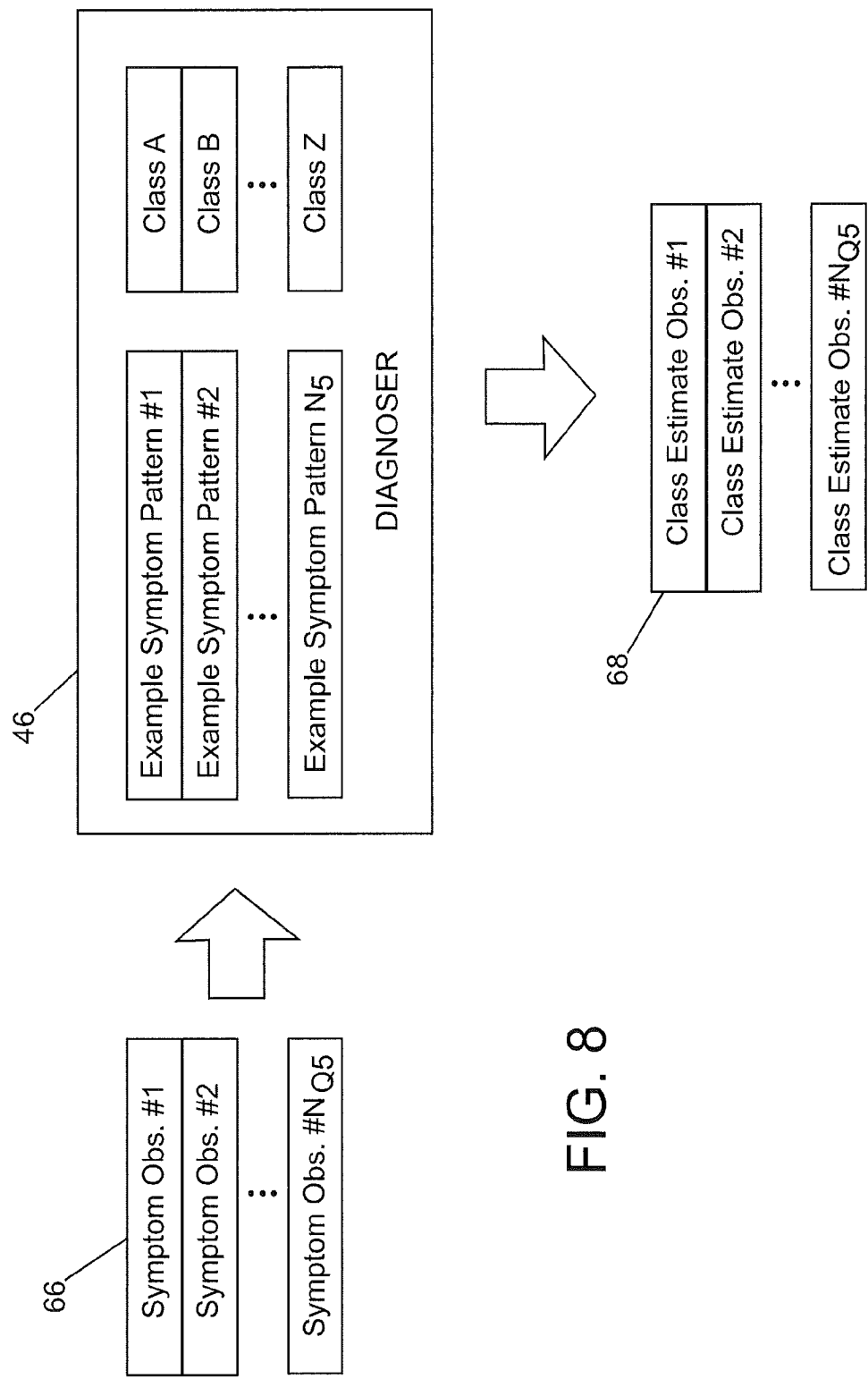
FIG. 8 is a block diagram of a portion of the system of FIG. 2 for generating a fault class estimate.

Referring to FIG. 8, in the fourth stage, the observations, associated alarms and residuals are entered in the diagnoser 46. In one embodiment, the diagnoser 46 is an NFIS diagnoser. In another embodiment, only data related to observations that generate an alarm 64 are entered in the diagnoser 46.

In one embodiment, the symptom observations 66 are entered into the diagnoser 46, which infers the class or type of fault for each symptom observation 66. Classification of the class (i.e. class "A"-"Z") is performed by comparing the symptom observations 66 to exemplar symptom patterns previously generated by the diagnoser 46, and then combining the results of this comparison with each exemplar symptom pattern to generate an estimate 68 of the class. In one embodiment, each symptom observation 66 is compared to the symptom patterns, and is assigned a class that is associated with the symptom pattern to which it is most similar. This class estimate 68, referred to as "Class Estimate Obs. #1-#NQS" in FIG. 8, is produced for each observation 58 that exhibits a fault. In one embodiment, the frequency of the classes (e.g., class A, class B, etc.) in the estimate observations 60 is determined to obtain a final diagnosis for the tool 20 and/or its components.

Faults may occur for any of various reasons, and associated fault classes are designated. Examples of fault classes include "Mud invasion" (MI), in which drilling mud 16 enters a tool 20 and causes failure, "pressure transducer offset" (PTO), in which sensor offset (negative and positive) causes problems in the control of the system 10 which eventually results in system failure, and "pump startup" (PS), in which a pump fails after the drill is started.

In one embodiment, "nearest neighbor" (NN) classification is utilized to determine which class a symptom observation 66 falls into, which involves assigning to an unclassified sample point the classification of the nearest of a set of previously classified points. An example of nearest neighbor classification is k-nearest neighbor (kNN). kNN refers to the classifier that examines the number "k" of nearest neighbors of a query pattern, and NN refers to the classifier that examines the closest neighbor (i.e. k=1). NN classification includes calculating a distance between a query pattern and each exemplar symptom pattern, and associating the query pattern with a class that is associated with the exemplar symptom pattern having the smallest distance.

kNN classification includes calculating the distances for each exemplar symptom pattern, sorting the distances, and extracting the output classes for the k smallest distances. The number of instances of each class represented by the k smallest distances is counted, and the class of the query pattern is designated as the class with the largest representation in the k nearest neighbors.

An example of nearest neighbor classification is described herein. In this example, a number "n" of exemplar symptom patterns are collected for "p" inputs (i.e., variables) that are examples of a number "$n_c$" classes. Also, "$C_i$" designates the $i^{th}$ class and "$n_i$" designates the number of examples for a class. Using these definitions, the sum of the number of examples for each class is equal to the number of exemplar symptom patterns.

In this example, the training inputs (i.e., exemplar symptom patterns) are denoted by X and the outputs (i.e., classes) are denoted by Y. "Memory" matrices or vectors are created for the inputs and outputs as follows:

$$X = \begin{bmatrix} X_{1,1} & \cdots & X_{1,p} \\ \vdots & & \vdots \\ X_{n_1,1} & \cdots & X_{n_1,p} \\ X_{n_1+1,1} & \cdots & X_{n_1+1,p} \\ \vdots & & \vdots \\ X_{n_1+n_2,1} & \cdots & X_{n_1-n_2,p} \\ \vdots & & \vdots \\ X_{n_1+\ldots+n_{c-1},1} & \cdots & X_{n_1+\ldots+n_{c-1},p} \\ \vdots & & \vdots \\ X_{n,1} & \cdots & X_{n,p} \end{bmatrix} \quad Y = \begin{bmatrix} C_1 \\ \vdots \\ C_1 \\ C_2 \\ \vdots \\ C_2 \\ \vdots \\ C_{n_c} \\ \vdots \\ C_{n_c} \end{bmatrix}$$

Classification of a query observation of the p inputs, which is denoted by x, is performed. The query observation x is represented by the following equation:

$$x = [x_1 \ldots x_p]$$

The distance, such as the Euclidean distance, can be used to determine how close the query observation is to each of the input exemplars. In equation form, the distance of the query to the $i^{th}$ example is given by:

$$d(X_i, x) = \sqrt{(X_{i,1}-x_1)^2 + (X_{i,2}-x_2)^2 + \ldots + (X_{i,p}-x_p)^2}$$

The distance calculation is repeated for the n exemplars, the result is a vector of n distances:

$$d = \begin{bmatrix} d(X_1, x) \\ d(X_2, x) \\ \vdots \\ d(X_n, x) \end{bmatrix}.$$

To classify x with the nearest neighbor classifier, the output or classification is the example class that corresponds to the minimum distance.

The types of classification methods used herein are merely exemplary. Any number or type of technique may be used for comparing data patterns from a sensor or sensor to known data patterns for fault classification may be used.

Figure 9:
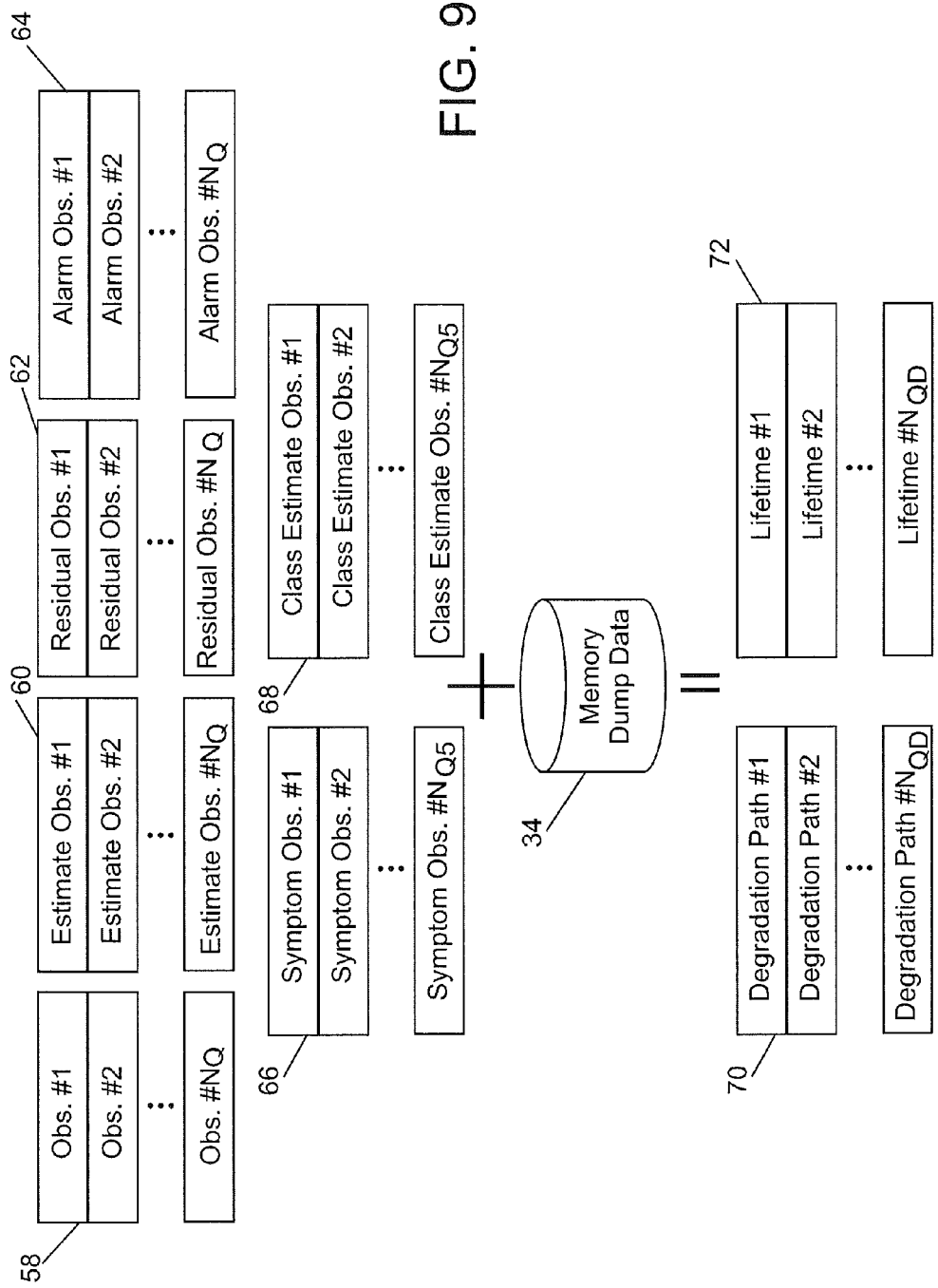
FIG. 9 is a block diagram of a portion of the system of FIG. 2 for generating a degradation path and an associated lifetime.

Referring to FIG. 9, in the fifth stage, a degradation path 70 and associated lifetime 72 is calculated for each signal. The degradation paths 70 are referred to as "Degradation Path #1-#$N_{QD}$" and the lifetimes 72 are referred to as "Lifetime #1-#$N_{QD}$", where $N_{QD}$ is the number of degradation paths 70. From this data, the remaining useful life of the tool can be calculated. The degradation path 70 is created by combining the data from the predictor 42, detector 44 and diagnoser 46, including one or more of the signal observations 58, signal estimates 60, estimate residuals 62, alarms 64, symptom observations 66, and class estimates 68. Additional information from the memory dump data 34 may also be combined, such as additional signals or composed signals (ex. running sum above a threshold), to create the degradation paths. Any suitable regression functions or data fitting techniques may be applied to the data retrieved from the tool to generate the degradation path. Many types of statistical analyses are utilized to calculate the degradation path, such as polynomial regression, power regression, etc. for simple data relationships, and utilizing fuzzy inference systems, neural networks, etc. for complex relationships.

The degradation path 70 may be generated from any desired measurement data. Examples of such data used for degradation paths include: drillstring crack length, measured pressure, electrical current, motor and/or drill rotation and temperature over a selected time period.

Lifetimes 72 that correspond to each degradation path 70 are generated. In one embodiment, a threshold value may be set for degradation path 70, indicating a failure. This threshold may be based on extrapolation of data from the existing degradation path 70, or based on pre-existing exemplar degradation paths associated with known failure times.

Figure 10:
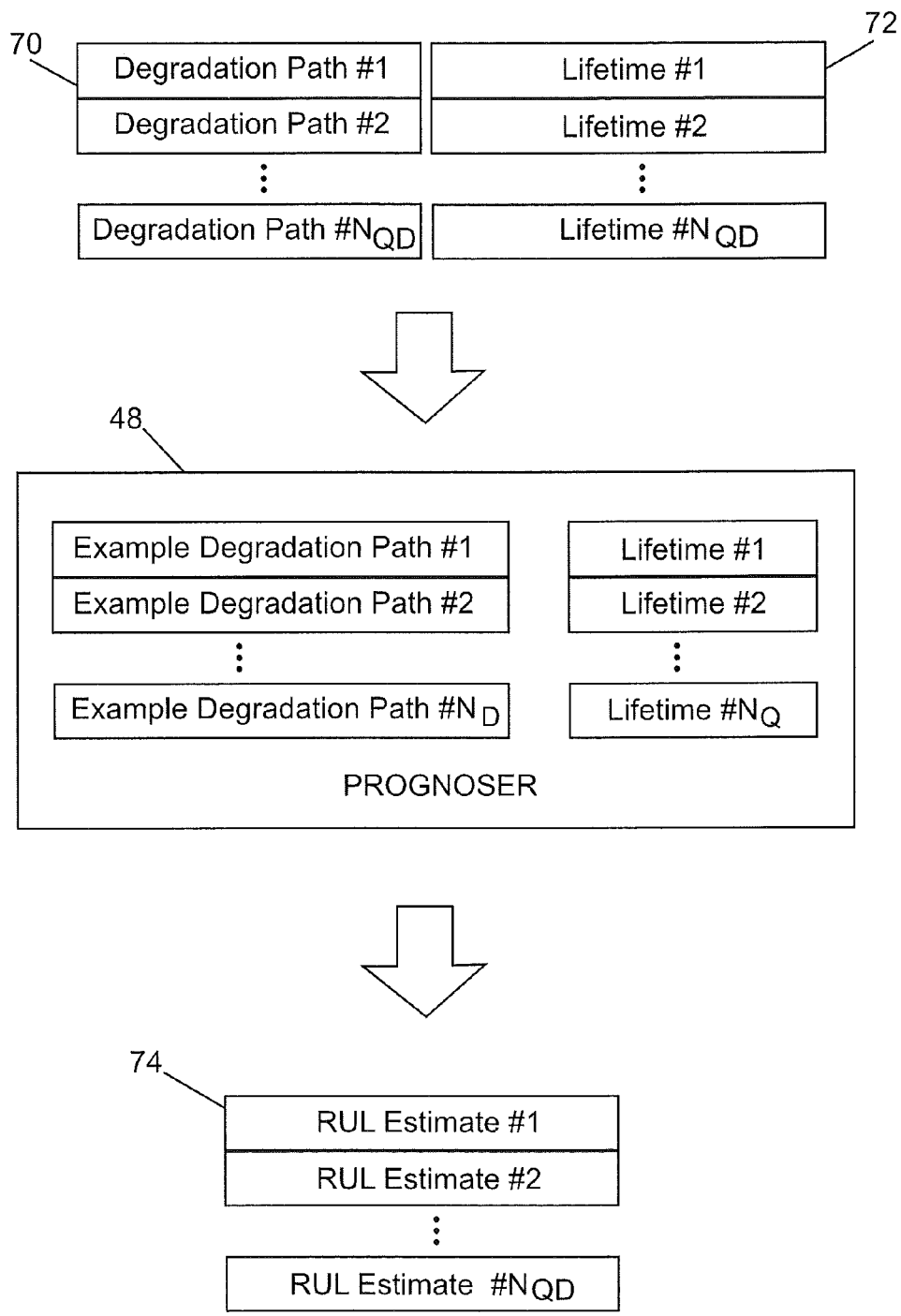
FIG. 10 is a block diagram of a portion of the system of FIG. 2 for generating an estimate of a remaining useful life of the downhole tool.

Referring to FIG. 10, the degradation paths 70 and lifetimes 72 are entered into the prognoser 48 which uses this information to generate estimates of the remaining useful life (RUL) 74 according to each path. The RUL for each path may be referred to as "RUL Estimate #1-#$N_{QD}$". In one embodiment, the prognoser 48 is an NFIS prognoser. The query degradation paths 70 are compared to the exemplar degradation paths, and the results of the comparison with the exemplar lifetimes are compared to generate an estimate 74 of the tool 20 and/or component RULs. In one embodiment, a path classification and estimation (PACE) model that utilizes an associated PACE algorithm is used to generate the RUL estimate 74.

The PACE algorithm is useful for situations in which i) each degradation path 70 includes a discrete failure threshold that accurately predicts when a device will fail, and ii) the degradation paths 70 do not exhibit a clear failure threshold. In one embodiment, for example, for degradation paths 70 that exhibit well established thresholds (e.g., seeded crack growth, and controlled testing environments, such as constant load or uniform cycling), the data can be formatted such that the instant where the degradation path 70 crosses the failure threshold is interpreted as a failure event.

In other embodiments, a defined discrete failure threshold is not always available. In some such embodiments, and indeed in many real world applications, where the failure modes are not always well understood or can be too complex to be quantified by a single threshold, the failure boundary is gray at best.

The PACE algorithm involves two general operations: 1) classify a current degradation path 70 as belonging to one or more of previously collected exemplar degradation paths and 2) use the resulting memberships to estimate the RUL.

Referring to FIG. 11, exemplar degradation signals 76 are shown, represented as "$Y_i(t)$", and their associated time-to-failure ($TTF_i$). In this example, it can be seen that there is not a clear threshold for the degradation path 70. In one embodiment, the exemplary signals 76 are generalized by fitting an arbitrary function 78, referred to as "$f_i(t, \theta_i)$", to the data via regression, machine learning, or other fitting techniques.

In one embodiment, two pieces of information are extracted from the degradation paths, specifically the TTFs and the "shape" of the degradation that is described by the functional approximations $f_i(t, \theta_i)$. These pieces of information can be used to construct a vector of exemplar TTFs and functional approximations, as follows:

$$TTF = \begin{bmatrix} TTF_1 \\ TTF_2 \\ TTF_3 \\ TTF_4 \end{bmatrix}$$

$$f(t, \Theta) = \begin{bmatrix} f_1(t, \theta_1) \\ f_2(t, \theta_2) \\ f_3(t, \theta_3) \\ f_4(t, \theta_4) \end{bmatrix}$$

where $TTF_i$ and $f_i(t, \theta_i)$ are the TTF and functional approximation of the $i^{th}$ exemplar degradation signal path, $\theta_i$ are the parameters of the $i^{th}$ functional approximation of the $i^{th}$ exemplar degradation signal path, and $\Theta$ are all of the parameters of each functional approximation.

In one embodiment, the degradation path is calculated using a General Path Model (GPM). The GPM involves parameterizing a device's degradation signal to calculate the degradation path and determine the TTF. In one embodiment, the TTF may be described as a probability of failure depending on time. The TTF may be set at any selected probability of failure.

In one embodiment, generic PDFs are fit to a degradation signal to measure the degradation path and TTF. For example, if N devices are being tested and $N_T$ is the total number of devices that have failed up to the current time T, then the fraction of devices that have failed can be interpreted as the probability of failure for all times less than or equal to the current time. More specifically, the cumulative probability of failure at time T, designated by $P(T \leq t)$, is the ratio of the current number of failed devices (NT) to the total number of devices (N), as shown in the following equation:

$$P(T \leq t) = \frac{N_T}{N}.$$

If a generic probability density function (PDF) is fit to observed failure data, then the above equation can be written in terms of a PDF, referred to as "f(t)" and its associated continuous distribution function (CDF), referred to as "F(t)":

$$P(T \leq t) = F(t) = \int_0^t f(t')\,dt'.$$

The above equation can also be used to define the probability that a failure has not occurred for all times less than the current time t, referred to as the reliability function "R(t)":

$$R(t) = 1 - F(t) = \int_t^\infty f(t')\,dt'.$$

In one embodiment, additional reliability metrics are calculated using TTF distribution data and the reliability functions to predict and mitigate failure, namely the mean time-to-failure (MTTF) and the 100pth percentile of the reliability function. MTTF characterizes the expected failure time for a sample device drawn from a population. The following equation can be used to calculate the MTTF for a continuous TTF distribution:

$$MTTF = \int_0^\infty t f(t)\,dt,$$

and can be further defined in terms of the reliability function:

$$MTTF = \int_0^\infty R(t)\,dt.$$

In one embodiment, as an alternative to the MTTF, the 100pth percentile of the reliability function is used to determine the time (tp) at which a specified fraction of the devices have failed. In equation form, the time at which 100p % of the devices have failed is simply the time at which the reliability function has a value of p:

$R(t_p)=1-p,$ where p has a value between zero and one.

Figure 12:
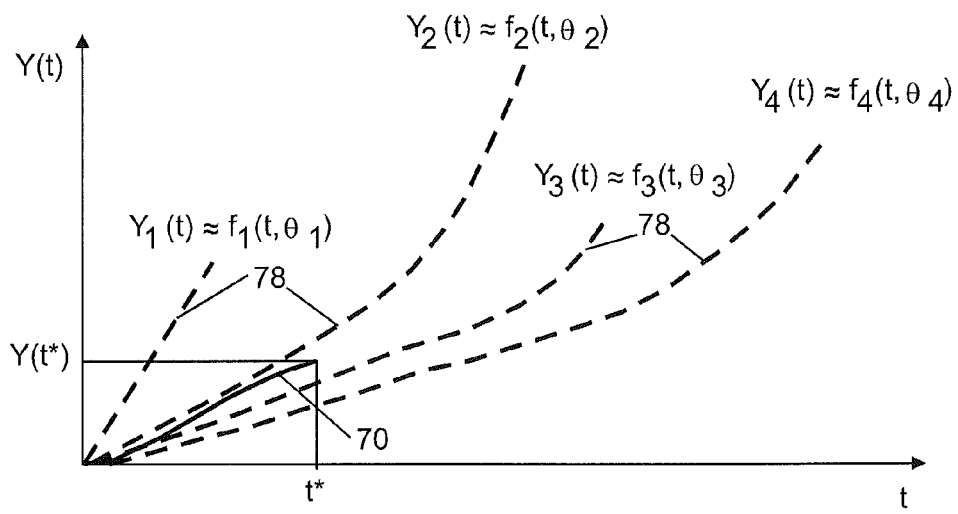
FIG. 12 illustrates an observed degradation path and the exemplar degradation paths of FIG. 11.

Referring to FIG. 12, the RUL is calculated for an observed degradation path 70. The degradation path 70 has a value "y(t*)" of the degradation path 70 at a time "t*". To estimate the RUL of the device via the PACE model, the algorithm presented in FIG. 13 is utilized.

Figure 13:
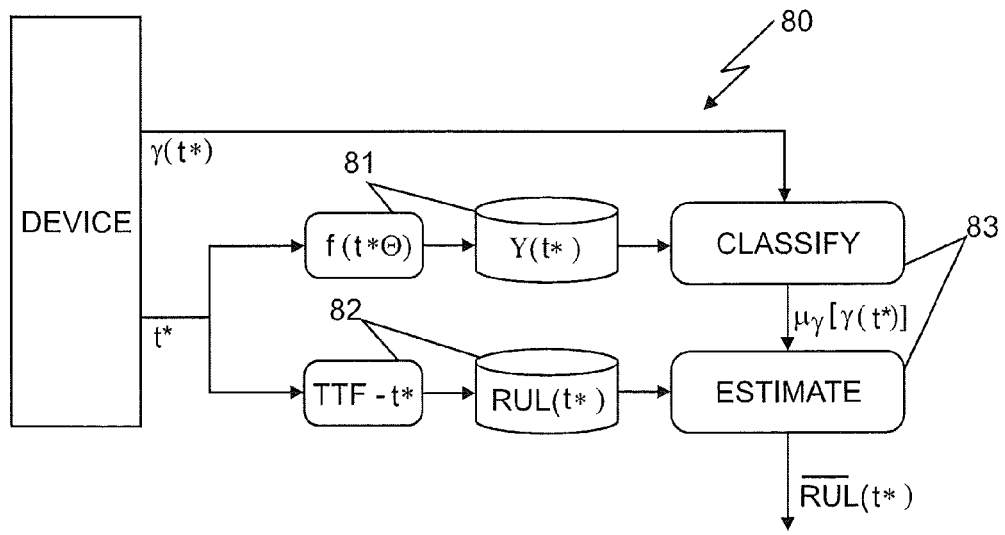
FIG. 13 is a flow chart providing an exemplary method for classifying a degradation path and estimating the RUL associated with the degradation path.

Referring to FIG. 13, in one embodiment, an exemplary method 80 for estimating the RUL includes any number of stages 81-83.

In the first stage 81, the expected degradation signal values according to the exemplar degradation paths 76 are estimated by evaluating the regressed functions at t*. The current time t* is used to estimate the expected values of the degradation path 70 according to the exemplar paths 76. In one embodiment, the expected values of the degradation path 70 according to the exemplar paths 76 are the approximating functions 78 evaluated at the time t*, as shown in the following equation:

$$f(t^*, \Theta) = \begin{bmatrix} f_1(t^*, \theta_1) \\ f_2(t^*, \theta_2) \\ f_3(t^*, \theta_3) \\ f_4(t^*, \theta_4) \end{bmatrix}.$$

The values of the above function evaluations can be interpreted as exemplars of the degradation path 70 at time t*. In this context, the above vector can be rewritten as a follows:

$$Y(t^*) = \begin{bmatrix} f_1(t^*, \theta_1) \\ f_2(t^*, \theta_2) \\ f_3(t^*, \theta_3) \\ f_4(t^*, \theta_4) \end{bmatrix} = \begin{bmatrix} Y_1(t^*) \\ Y_2(t^*) \\ Y_3(t^*) \\ Y_4(t^*) \end{bmatrix}.$$

In stage 82, the expected RULs are calculated by subtracting the current time t* from the observed TTFs of the exemplar paths 76. This is shown, for example, in the following equation:

$$RUL(t^*) = TTF - t^* = \begin{bmatrix} TTF_1 - t^* \\ TTF_2 - t^* \\ TTF_3 - t^* \\ TTF_4 - t^* \end{bmatrix}.$$

In stage 83, the observed degradation path 70 at time t*, y(t*), is classified based on a comparison with the expected degradation signal values Y(t*). The degradation path 70 is classified as belonging to the class associated with the exemplar path 76 to which it is closest in value. In one embodiment, the signal value y(t*) can be compared to the expected degradation signal values Y(t*) by any one of a number of classification algorithms to obtain a vector of memberships $\mu_Y[y(t^*)]$. In this embodiment, the memberships have values of zero or one and $\mu_{Y_i}[y(t^*)]$ denotes the membership of y(t*) to the $i^{th}$ exemplar path, as shown in the following equation:

$$\mu_Y[y(t^*)] = \begin{bmatrix} \mu_{Y_1}[y(t^*)] \\ \mu_{Y_2}[y(t^*)] \\ \mu_{Y_3}[y(t^*)] \\ \mu_{Y_4}[y(t^*)] \end{bmatrix}.$$

The vector of memberships of the signal value y(t*) to the exemplar degradation paths 76 is combined with the vector of expected RULs to estimate the RUL of the individual device.

In one embodiment, the estimate of the RUL of a device is generated by applying one or more of multiple types of prognosers, including a population prognoser to estimate the RUL from population based failure statistics, and individual prognosers including a causal prognoser to estimate the RUL by monitoring the causes of component faults/failures (e.g. by examining stressor signals such as vibration, temperature, etc.), and an effect prognoser to estimate the RUL by examining the effect of component fault/failure on the individual device by examining the output of a monitoring system. In one embodiment, multiple effect prognosers are provided to estimate the RUL for each fault class.

In one example, the causal prognoser utilizes absorbed vibration energy data to estimate the RUL by examining the cause of failure. In another example, the effect prognoser calculates a cumulative sum of the alarms 64 is used to estimate the RUL by examining the effect of the onset of failure.

In one example, the population prognoser is continuously used to estimate the RUL by calculating the expected RUL given the current amount of time that the device has been used. In addition, stressor signal data (e.g., vibration, temperature, etc.) is used as inputs to the causal prognosers for each of the identified effects, which estimates the RUL by examining the amount of stress absorbed by the device. Similarly, relevant signal data is also extracted from the collected device data and used as inputs to a monitoring system, which determines whether the device is currently operating in a nominal or degraded mode. If the monitoring system infers that the device is operating in a degraded mode, then the original signals and monitoring system outputs are used as inputs to a diagnosis system that subsequently selects the appropriate effect prognoser based on the observed patterns. For example, if the diagnoser 46 classifies the current operation of the device as being representative of the $i^{th}$ fault class, then the $i^{th}$ effect prognoser will be used to estimate the RUL.

Figure 14:
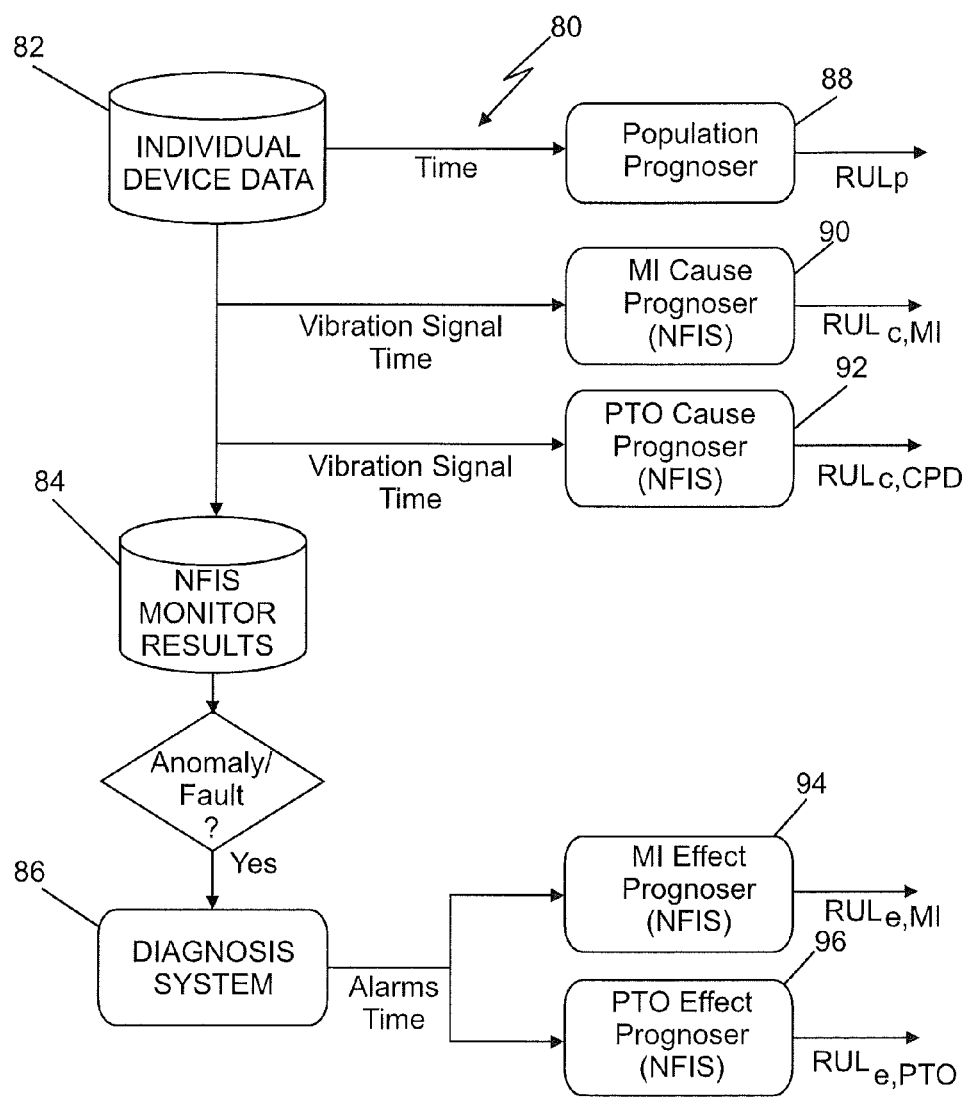
FIG. 14 depicts an alternative embodiment of a system for assessing the health of a downhole tool.

Referring to FIG. 14, an alternative exemplary system 80 includes a device database 82, a monitor 84, a diagnosis system 86, a population prognoser 88, a MI cause prognoser 90, a PTO cause prognoser 92, a MI effect prognoser 94, and a PTO effect prognoser 96. The monitor 84, for example, includes the predictor 42 and the detector 44. The diagnosis system 86, for example, includes the diagnoser 46.

The population prognoser 88 receives operational time data and generates the RUL therefrom. The MI and PTO cause prognosers 90, 92 receive time data and causal data, such as vibration data, and predict the RUL for the absorbed vibration energy. The MI and PTO effect prognosers 94, 96 receive data generated by the diagnosis system 86, and calculate the RUL therefrom. In one embodiment, the MI and PTO effect prognosers 94, 96 are trained to estimate the RUL for mud invasion (MI) and pressure transducer offset (PTO) failures. In one embodiment, the MI and PTO effect prognosers 94, 96 calculate the RUL from the cumulative sum of the fault alarms 64.

Although the cause and effect prognosers utilize MI and PTO fault classes in generating the RUL, the system 80 is not limited to ant specific fault classes. Likewise, although the cause and effect prognosers are described in this embodiment as NFIS prognosers, the prognosers may utilize any suitable algorithm.

In one embodiment, to develop the population prognoser 88, data is collected from a plurality of devices that are subject to normal operating conditions or accelerated life testing, to extract time-to-fail (TTF) information for each device. The cumulative TTF distribution is then calculated. The first step in the development of the population prognoser 88 is to fit a probability density function (PDF) to the TTF data, such as the cumulative TTF distribution. In one embodiment, to fit the data, a cumulative distribution function (CDF) associated with the PDF is estimated and the resulting estimates are used to estimate the parameters of a general distribution. Multiple PDFs may be fit to the data via, for example, least squares, to determine the best model for the failure times.

Other functions may be generated by the population prognoser 88. For example, the population prognoser 88 may use accelerated life testing or proportional hazards modeling to define the failure rate as a function of time. In one embodiment, the proportional hazards model may also take into account various stressor variables in addition to time variables.

In one embodiment, an individual based prognoser is utilized to determine the RUL. Examples of individual based prognosers include cause and effect prognosers 88, 90, 92, 94 and 96. The individual based prognoser, in some examples, uses the GPM and produces RUL or reliability estimates. In embodiments that use the GPM, the device degradation is treated as an instantiation of a progression toward a failure threshold. Examples of algorithms that use the GPM include Categorical Data Analysis, Life Consumption Modeling and Proportional Hazards Modeling, each of which produce either reliability estimates or RUL. Another example of an algorithm that uses the GPM includes various extrapolation methods, which are used to produce the RUL. An example of an algorithm that does not use the GPM is a Neural Network algorithm, which is used to produce the RUL.

In one embodiment, the individual based prognoser algorithms utilize the following method. First, exemplar degradation paths are characterized by determining the "shape" of the path and a critical, failure threshold. The term "shape" refers to the parameter values of the degradation signal and form of a physical model for various aspects of a device, such as the degradation, the parameters and the form of the function regressed onto the path. In this embodiment, the exemplar degradation paths need not be produced by example devices, but can be the product of physical models of the degradation mechanism. The failure threshold may be set manually if known or can be inferred from the exemplar paths.

Next, the results of the path parameterization and threshold are used to construct an individual prognostic model. Finally, for a test device, to estimate the reliability (i.e., estimate a probability of failure) or RUL at some time t, the current progression of the test path is presented as an input to the prognostic algorithm, which produces an estimate of the device reliability or RUL.

Various algorithms or models may be employed to parameterize the exemplar and measured degradation signals (e.g., environmental or operational stress signals) to generate the degradation paths, and to estimate the RUL. Examples of such algorithms are described herein.

Categorical Data analysis (CDA) algorithms employ logistic regression to map observed degradation parameters to one of two conditions, such as "no failure" (0) and "failure" (1). CDA uses logistic regression to establish a relationship between a set of inputs (continuous or categorical) to categorical outputs.

In this method, the probability of failure for an observation of degradation signals is estimated via a logistic regression model trained on historical degradation data. For each degradation signal, there is an associated critical threshold, and a failure is considered to have occurred when any one of the degradation signals crosses its associated threshold. This method provides a reliability estimate, but does not generate the RUL. In one embodiment, various time series analyses such autoregressive moving average (ARMA) or curve fitting, are used to extrapolate the degradation signal to a future time where the reliability is zero or where the extrapolated path crosses the threshold and hence estimate the RUL.

In proportional hazard (PH) modeling, the failure rate or hazard function depends on the current time as well as a series of stressor variables that describe the environmental and operational stresses that a device is exposed to. Another example for estimating RUL is life consumption modeling (LCM). In LCM, a new component begins its life with perfect health/reliability. As the device is used and/or exposed to various operating conditions, the health/reliability is deteriorated by amounts that are related to the damage absorbed by the device. An exemplary LCM algorithm is accumulated damage modeling (ADM), which uses rough classes of stress conditions to estimate the increment by which the component health is degraded after each use. Another similar approach is the cumulative wear (CW) model, which estimates the on-line reliability of a device by incrementally decreasing its reliability as it is used.

Extrapolation methods generally involve extrapolating the health of the device by using a priori knowledge and observations of historic device operation. In general the extrapolation can be performed by either: 1) predicting future device stress conditions and then applying the stress conditions to a model of device degradation to estimate the RUL or 2) use trending techniques to extrapolate the path of the degradation or reliability signal to a failure threshold.

Various types of a priori knowledge can be used to estimate the future environmental and operational conditions. This knowledge may take the form of multiple stress functions (i.e., stressors), each over a specific time interval. For example, a deterministic sequence may be used if future stress levels and exposure times are known, by iteratively inputting the pre-determined stress levels and exposure times to a model of the device degradation to estimate the future health of the device.

In population based probabilistic sequence methods, historical data collected from a population of similar devices are used to estimate probabilities for the incidence of specific stress levels and exposure times. In individual based probabilistic sequence methods, historical data collected from the individual device is used to estimate the probabilities. To estimate the distribution of the RULs of a device given its current state, simulations such as Monte Carlo simulations are run in which the stress level and exposure times are sampled according to the estimated probabilities. Finally, the RUL for the individual device is estimated by taking the expected value of the resulting PDF of the RULs.

Other examples of prognostic algorithms include Fuzzy Prognostic Algorithms such as Fuzzy Inference Systems (FIS) and Adaptive Neural Fuzzy Inference Systems (ANFIS). Various regression functions and neural networks, and other analytical techniques may be used to estimate the RUL The systems and methods described herein provide various advantages over prior art techniques. The systems and methods described herein are simpler and less cumbersome than prior art techniques, which generally employ detailed physical models or cumbersome expert systems. In contrast to methods that impose structure on the data through the use of physical models or detailed expert systems, the systems and methods described herein deriving structure from the data by allowing examples to fully define the analysis components.

In addition, since the systems and methods described herein use data driven techniques (i.e. data defines the model), the resulting systems are easily automated and flexible enough to be adapted for changing deployment requirements.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system for assessing a health of a borehole tool, the system comprising:

at least one sensor associated with the borehole tool configured to obtain observation data relating to a characteristic of a formation;

a memory in operable communication with the at least one sensor, the memory including a database configured to store the observation data relating to the characteristic of the formation; and a processor in operable communication with the memory configured to receive the observation data relating to the characteristic of the formation, the processor including:

a detector receptive to the observation data and configured to identify whether the borehole tool is operating in a normal mode or a degraded mode, the degraded mode being indicative of a fault in the borehole tool;

a diagnoser responsive to the observation data configured to identify a type of fault from at least one symptom pattern; and a prognoser in operable communication with the at least one sensor, the detector and the diagnoser, the prognoser configured to calculate a remaining useful life (RUL) of the borehole tool based on a degradation path created from information from at least one of the at least one sensor, the detector and the diagnoser, wherein the prognoser includes a population prognoser configured to calculate the RUL based on a duration of use of the borehole tool, a cause prognoser configured to calculate the RUL based on causal data, and an effect prognoser configured to calculate the RUL based on effect data generated from the fault.

2. The system of claim 1, further comprising a predictor in operable communication with the detector, the predictor configured to receive one or more exemplar observations and comparing the observation data to the one or more exemplar observations to generate one or more estimated observations.

3. The system of claim 2, wherein the processor is configured to generate one or more residual observations based on a comparison of the observation data and the one or more estimated observations, and the detector is configured to generate one or more exemplar residual observations and identify the degraded mode based on a comparison between the one or more residual observations and the one or more exemplar residual observations.

4. The system of claim 3, wherein the diagnoser is configured to identify the degraded mode responsive to the one or more residual observations exceeding a selected threshold.

5. The system of claim 1, wherein the processor is configured to generate the symptom pattern for observation data identified as representing the degraded mode, and the diagnoser is configured to generate one or more exemplar symptom patterns and identify a type of the fault based on a comparison between the symptom pattern and the one or more exemplar symptom patterns.

6. The system of claim 1, wherein the processor is configured to generate a degradation path and an associated lifetime for observation data identified as representing the degraded mode, and the prognoser is configured to estimate the RUL based on a comparison of the degradation path and one or more exemplar degradation paths.

7. The system of claim 6, wherein the prognoser is configured to estimate the RUL by identifying a closest exemplar degradation path associated with the type of fault at a time of the fault, calculating a time-to-failure of the closest exemplar degradation path, and subtracting the time of the fault from the time-to-failure.

8. The system of claim 1, wherein the detector, the diagnoser and the prognoser form a data-driven model.

9. The system of claim 8, wherein the data-driven model is a nonparametric fuzzy inference system (NFIS).

10. A method for assessing a health of a borehole tool, the method comprising:
receiving observation data relating to a characteristic of a formation obtained at at least one sensor associated with the borehole tool; and
using a processor to:
operate a detector to identify whether the borehole tool is operating in a normal mode or a degraded mode, the degraded mode being indicative of a fault in the borehole tool,
operate a diagnoser responsive to an identification of the degraded mode to identify a type of fault from at least one symptom pattern,
create a degradation path using information from the at least one of the sensor, the detector and the diagnoser, and
operate a prognoser to calculate a remaining useful life (RUL) of the borehole tool based on a comparison of the observation data with the created degradation path wherein calculating the RUL is based on: a duration of use of the borehole tool, causal data, and effect data generated from the fault.

11. The method of claim 10, further comprising receiving one or more exemplar observations and comparing the observation data to the one or more exemplar observations to generate one or more estimated observations.

12. The method of claim 11, further comprising generating one or more residual observations based on a comparison of the observation data and the one or more estimated observations, generating one or more exemplar residual observations, and identifying the degraded mode based on a comparison between the one or more residual observations and the one or more exemplar residual observations.

13. The method of claim 12, further comprising identifying the degraded mode is responsive to the one or more residual observations exceeding a selected threshold.

14. The method of claim 10, further comprising generating the symptom pattern for observation data identified as representing the degraded mode, generating one or more exemplar symptom patterns, and identifying the type of the fault based on a comparison between the symptom pattern and the one or more exemplar symptom patterns.

15. The method of claim 10, wherein the processor is configured to generate a degradation path and an associated lifetime for observation data identified as representing the degraded mode, and the prognoser is configured to estimate the remaining useful life based on a comparison of the degradation path and one or more exemplar degradation paths.

16. The method of claim 10, wherein calculating the RUL includes identifying a closest exemplar degradation path associated with the type of fault at a time of the fault, calculating a time-to-failure of the closest exemplar degradation path, and subtracting the time of the fault from the time-to-failure.

17. A non-transitory computer-readable medium containing computer instructions stored therein for causing a computer processor to perform a method for assessing a health of a borehole tool, the method comprising:
receiving observation data relating to a characteristic of a formation at at least one sensor associated with the borehole tool;
operating a detector to identify whether the borehole tool is operating in a normal mode or a degraded mode, the degraded mode being indicative of a fault in the borehole tool;
operating a diagnoser responsive to an identification of the degraded mode to identify a type of fault from at least one symptom pattern;
creating a degradation path using information from the at least one of the sensor, the detector and the diagnoser; and
operating a prognoser to calculate a remaining useful life (RUL) of the borehole tool based on a comparison of the observation data with the created degradation path, wherein calculating the RUL is based on: a duration of use of the borehole tool, causal data, and effect data generated from the fault.

18. The computer-readable medium of claim 17, wherein the instructions further include:
receiving one or more exemplar observations and comparing the observation data to the one or more exemplar observations to generate one or more estimated observations;

generating one or more residual observations based on a comparison of the observation data and the one or more estimated observations;

generating one or more exemplar residual observations; and identifying the degraded mode based on a comparison between the one or more residual observations and the one or more exemplar residual observations.

* * * * *